US007837095B2

(12) United States Patent
Clauser et al.

(10) Patent No.: US 7,837,095 B2
(45) Date of Patent: Nov. 23, 2010

(54) SECURE BAG ASSEMBLY FOR A LOCKABLE REMOVABLE CASSETTE

(75) Inventors: Robert J. Clauser, Columbus, NJ (US); Stephen R. Watrous, Moravia, NY (US); John D. Snider, West Chester, PA (US); David Blasko, Trappe, PA (US); Chad Schneider, Baltimore, MD (US); Brian Lipford, Bel Air, MD (US); Joel Price, Chevy Chase, MD (US); Neil M. Young, Downingtown, PA (US)

(73) Assignee: MEI, Inc., West Chester, PA (US)

( * ) Notice: Subject to any disclaimer, the term of this patent is extended or adjusted under 35 U.S.C. 154(b) by 914 days.

(21) Appl. No.: 11/616,775

(22) Filed: Dec. 27, 2006

(65) Prior Publication Data

US 2007/0145064 A1 Jun. 28, 2007

Related U.S. Application Data

(60) Provisional application No. 60/754,355, filed on Dec. 27, 2005.

(51) Int. Cl.
*G06Q 40/00* (2006.01)
*G07D 11/10* (2006.01)
*G07F 19/00* (2006.01)

(52) U.S. Cl. ........................ 235/379; 235/375; 194/350

(58) Field of Classification Search ................. 235/379, 235/375, 382, 486; 194/350, 352, 206
See application file for complete search history.

(56) References Cited

U.S. PATENT DOCUMENTS

| | | | | |
|---|---|---|---|---|
| 5,890,439 | A * | 4/1999 | McGunn | 109/47 |
| 6,712,352 | B2 | 3/2004 | Bergeron | |
| 7,559,183 | B2 | 7/2009 | Bell | |
| 2003/0180131 | A1 * | 9/2003 | Lewis | 414/411 |

FOREIGN PATENT DOCUMENTS

| | | | |
|---|---|---|---|
| WO | WO 02/19287 | A2 | 3/2002 |
| WO | WO 2005/054055 | | 6/2005 |

* cited by examiner

*Primary Examiner*—Edwyn Lbaze
(74) *Attorney, Agent, or Firm*—Fish & Richardson P.C.

(57) ABSTRACT

A method and apparatus are provided relating to a secure bag assembly to secure cash in transit ("CIT"). In some implementations, the secure bag assembly is installed in a lockable, removable cassette that is fitted to a bill validator. The cassette and bill validator can be installed in an enclosure like those found in retail kiosks, self-checkout terminals, retail safes or gaming machines. In such an implementation, bank notes are deposited in the bill validator and once identified and validated, are securely stacked in the bag assembly within the cassette. The bag assembly can be used for capacities of one banknote up to the maximum capacity allowed by the cassette. The bag assembly is secured in place when installed and is sealed automatically upon removal from the cassette.

56 Claims, 29 Drawing Sheets

SECURE BAG ASSEMBLY FOR A LOCKABLE REMOVABLE CASSETTE

CROSS-REFERENCE TO RELATED APPLICATION(S)

This application claims the benefit of priority of U.S. Provisional Patent Application Ser. No. 60/754,355, filed on Dec. 27, 2005, the contents of which are hereby incorporated by reference.

TECHNICAL FIELD

This disclosure relates to a secure bag assembly for a lockable removable cassette.

BACKGROUND

In recent times, it has become more common for consumers to conduct transactions by using an automated terminal rather than person-to-person. The reasons for this are varied, but include the needs to reduce labor costs, reduce transaction errors and increase transaction speed.

In one example, consumers can utilize a self check-out terminal at a supermarket or retail store. In these environments, paper currency, i.e., banknotes or cash, is still extensively used. After the consumer presents his or her goods to the terminal, cash is deposited in a bill validator, which stacks the bills into a cassette after identification and verification. When it comes time to remove cash from the cassette(s), workers remove the stacks of bills and transport them accordingly. The current transport process requires that the workers directly handle and view the cash stored in the cassette.

From the merchant's point of view, cash can present problems associated with security and efficient handling. Unlike non-currency financial instruments such as credit cards, debit cards, checks and the like, which are generally integrated with a computerized banking system, cash is inherently liquid and requires no centralized authorization. Thus, notwithstanding the various security measures in use, from the instant cash is removed from the cassette(s), its anonymous and liquid nature makes cash a persistent and tempting target for pilferage, misappropriation and theft.

SUMMARY

In an aspect of the present invention, a method and apparatus are provided relating to a secure container assembly to secure cash in transit ("CIT") or other documents of value. In some implementations, the secure container assembly is installed in a lockable, removable cassette that is fitted to a bill validator. The cassette and bill validator can be installed in an enclosure like those found in retail kiosks, self-checkout terminals, retail safes or gaming machines. In such an implementation, bank notes are deposited in the bill validator and once identified and validated, are securely stacked in the container assembly within the cassette. The container assembly can be used for capacities of one banknote up to the maximum capacity allowed by the cassette. The container assembly is secured in place when installed and is sealed (i.e., closed or made secure against access) automatically upon removal from the cassette.

The details of one or more implementations are set forth in the accompanying drawings and the description below. Various features and advantages will be apparent from the description and drawings, and from the claims.

DETAILED DESCRIPTION

Figure 1:
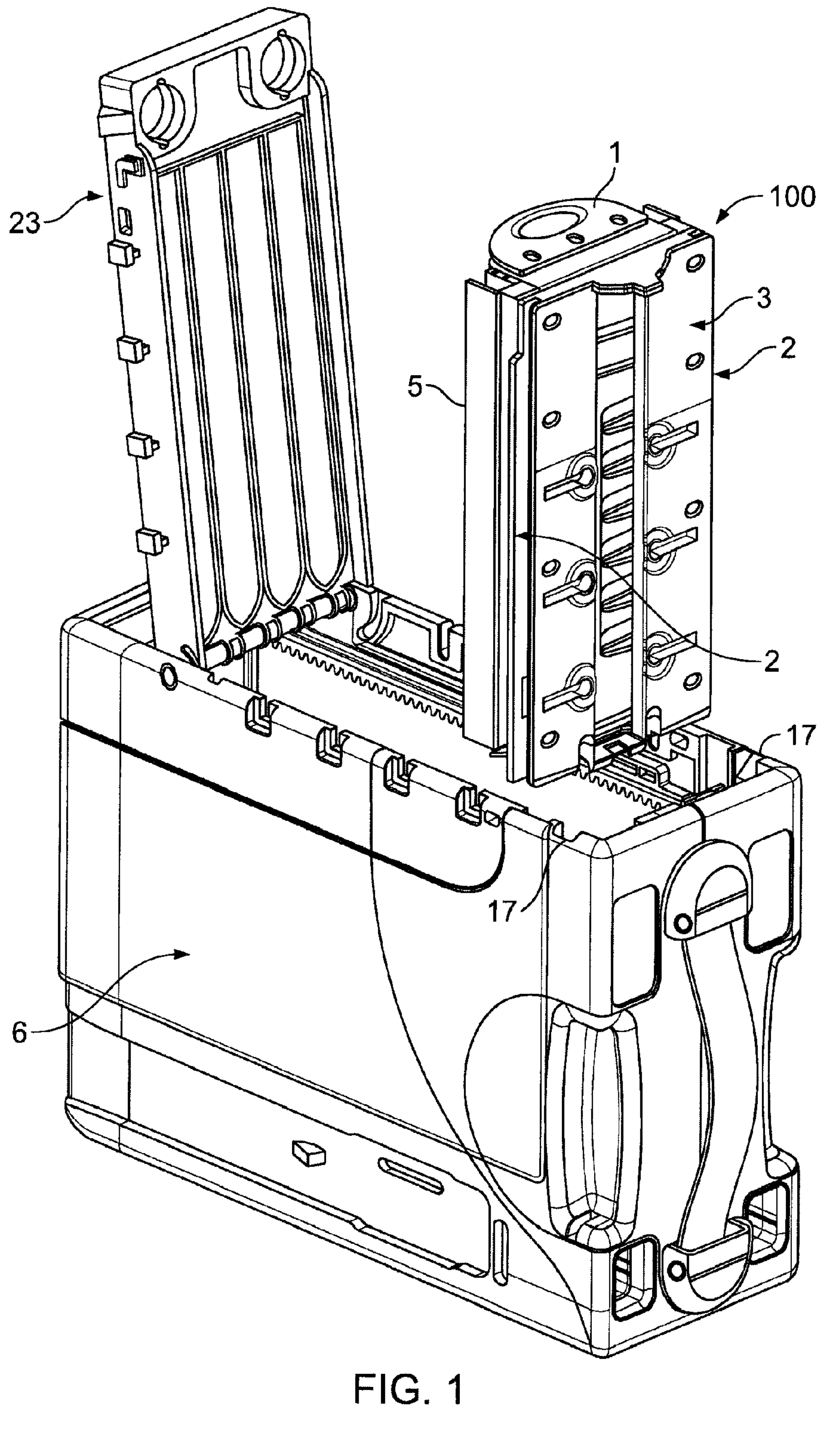
FIG. 1 is a view of a secure bag assembly being installed in a cassette.

The following is a description of preferred implementations, as well as some alternative implementations, of a method and apparatus relating to a secure container assembly for a lockable removable cassette. The secure container assembly can be used for storing documents of value, e.g., banknotes, vouchers and the like. The secure container assembly includes a container (e.g., for storing documents) that can take many forms, e.g., the container may be rigid or flexible. In some implementations, the container is a bag.

In some implementations, a secure bag assembly is installed in a lockable, removable cassette which is fitted to a bill validator. Implementations that install in a lockable, removable cassette can provide document storage in a widely used format. In a particular implementation, the secure bag assembly includes four major components: (1) a front subassembly which includes security features and has a bill path opening, (2) a container (e.g., a bag) for storing bills, coupled to the bill path opening, (3) a back subassembly, which structurally supports the bag and (4) a strap which enables removal of the secure bag assembly from the cassette, seals the bill path opening and supports the contents of the bag. When the bag is ready to be emptied, e.g., the maximum capacity of the cassette has been reached, the cassette is removed from the validator and the cassette door is opened. The user is presented with the strap, which is accessible once the cassette door is open. The strap is coupled to the front subassembly and back subassembly, and surrounds the bag. The operator pulls the strap, which causes at least two actions to occur. First, the bill path opening is sealed as the strap is pulled. Second, the secure bag assembly is released from the cassette after the bill path opening is sealed. Preferably, the secure bag assembly is not released from the cassette until the bill path opening is fully sealed. Because the strap is a part of the secure bag assembly, it can allow a user to seal the bill path opening and unlock the secure bag assembly without needing special tools or extra pieces.

The strap operates in cooperation with locking features that allow only unidirectional movement of the strap. Once the strap has been pulled, security features mate with the strap to prevent backward movement, thereby preventing access to the bills via the bill path opening. The strap also helps to keep the stack of bills stable. To that end, some implementations include a strap that is made of two different materials: an elastic portion and an inelastic portion. For instance, when the secure bag is at maximum capacity and the strap is pulled, the elastic portion of the strap will stretch to the extra length needed to firmly hold the full stack of banknotes. However, it is the inelastic portion that mates with the locking features to preserve integrity.

Preferably, the secure bag assembly is separated from the cassette in a tamper-evident fashion and the bag remains tamper-evident until it is physically cut or opened. When a new secure bag assembly is inserted into the cassette, it is locked in place when inserted. The bag is intended to allow smoke and/or dye staining of the banknotes when used with a smoke/dye enabled system. The bag material preferably inhibits a clear view of the banknote contents by, e.g., being semi-opaque to opaque. The bag material can be made from a wide variety of materials depending on the application, with stretchable fabric being one option. Other options include mesh cloth, plastic or paper. The bag material can be folded on itself, e.g., in an accordion-like shape, to minimize volume when empty or only partially filled.

Overview of an Implementation

FIG. 1 depicts an implementation of a secure bag assembly 100 about to be installed into a cassette 6. Cassette 6 (also known as a "cashbox") is usually implemented as part of a bill validator. Bill validators are commonly found in, e.g., self check-out kiosks at retail stores, vending machines and gaming machines. Cassettes are designed to store the validated, collected cash securely and are usually removable and lockable. A stacker mechanism 16 (see FIGS. 10-12) is installed inside the cassette 6 to feed validated bills into the secure bag assembly 100 for storage. Thus, bills are stored inside the secure bag assembly 100 rather than being readily accessible in the open space of the cassette 6. In this implementation, the secure bag assembly 100 expands as it holds more and more bills, but is installed in a substantially flat state (as shown).

Figure 2A:
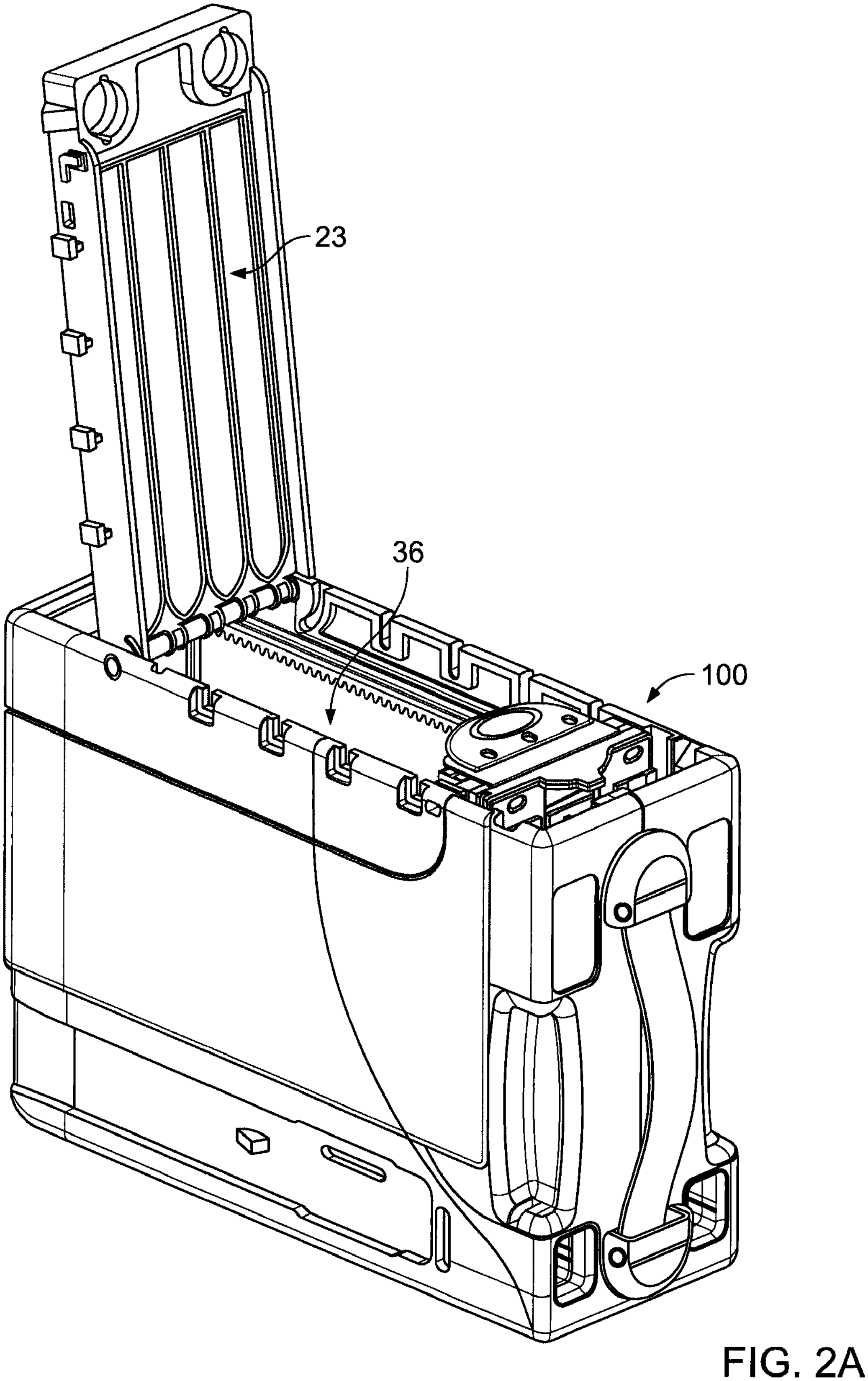
FIG. 2A is a view of a secure bag assembly installed in a cassette, with the cassette door open.

FIG. 2A depicts the secure bag assembly 100 installed into cassette 6. The bag portion of the assembly 100 can expand such that substantially all of the cassette storage area 36 is utilized for bill storage.

Figure 2B:
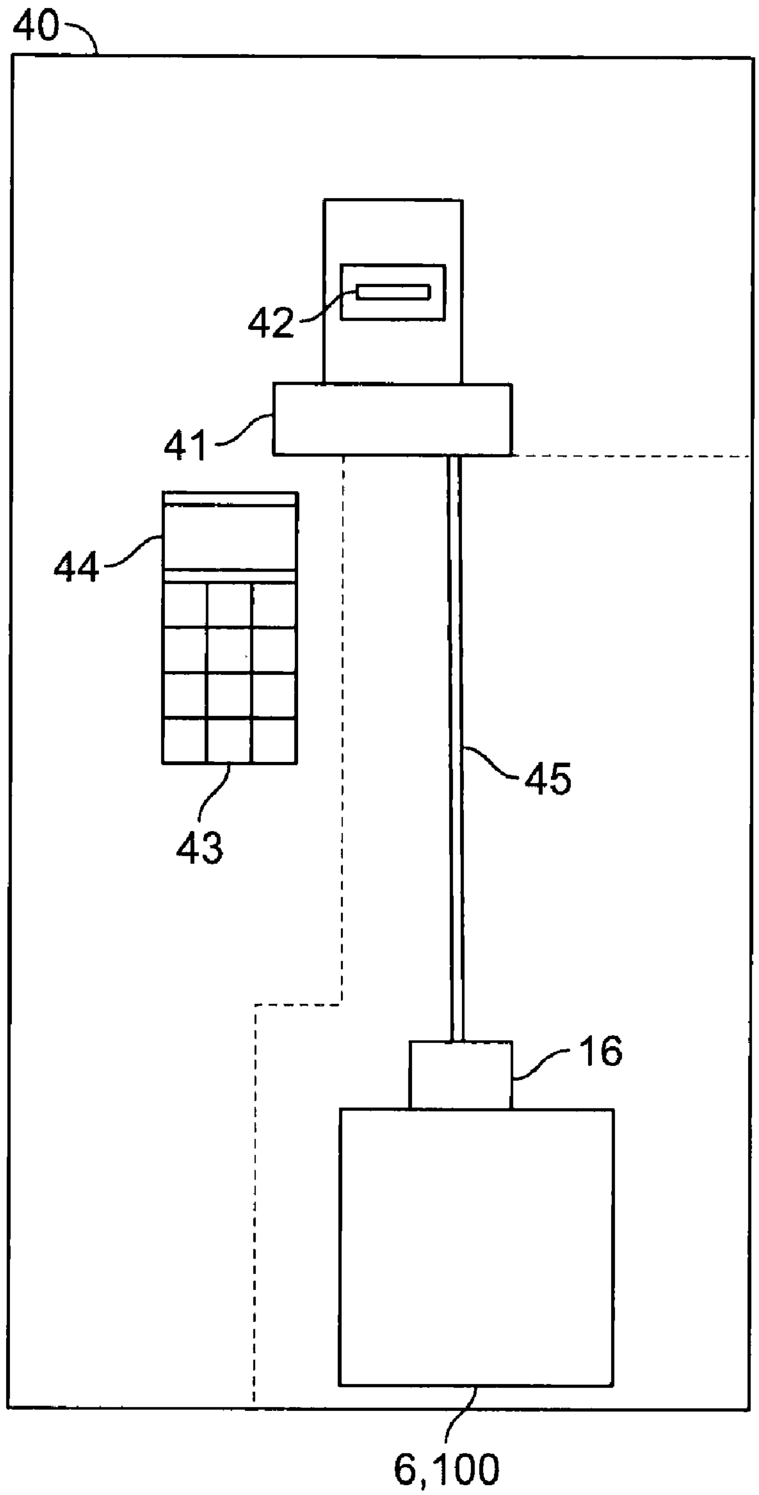
FIG. 2B is a schematic representation of a secure bag assembly installed in a kiosk including a bill validator.

FIG. 2B depicts the secure bag assembly 100 installed into a cassette 6 that is part of a kiosk 40. As discussed, kiosk 40 may be used, for example, in a retail or gaming environment to conduct transactions. The kiosk 40 includes a bill validator 41 that determines the authenticity of the document fed via the bill validator input 42. Depending on the implementation, the bill validator 41 may also determine the denomination of a banknote or the authenticity of a voucher. An input panel 43 can be provided for receiving information from a user, whereas a display panel 44 can provide information to a user. The portion of the kiosk 40 outlined by the dotted lines is made transparent to schematically illustrate the installation of the stacker assembly 16 and cassette 6 (into which the secure bag assembly 100 has been installed). In this implementation, the stacker mechanism 16 is disposed outside the cassette 6. Bills or other documents that have been validated by the validator 41 are fed, via a bill transport path 45, to a stacker mechanism 16, which feeds the documents into the cassette 6, and thus, into the assembly 100.

Figure 3:
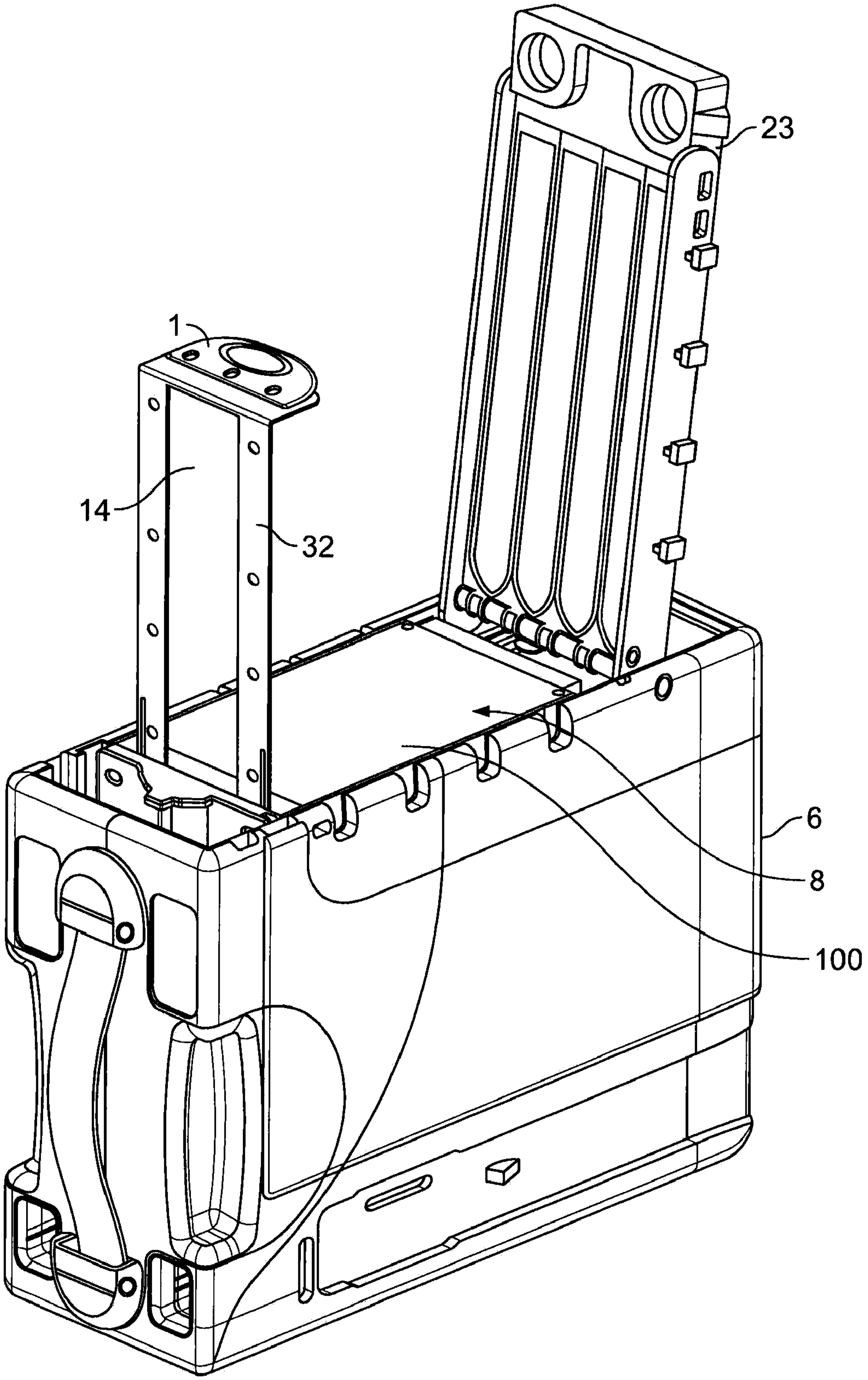
FIG. 3 is a view of a secure bag assembly, filled with bills, about to be removed from a cassette. The secure bag assembly is shown unlocked from the cassette and sealed.

FIG. 3 illustrates an installed secure bag assembly 100 in which the bag 8 is full and substantially fills the cassette storage area. After the user removes the cassette 6 from the bill validator, the cassette door 23 is opened to gain access to the secure bag assembly 100. Although the bag 8 and the rest of the assembly 100 is visible, there is no cash visible. Reducing the visibility of the cash may decrease the likelihood of theft. Accordingly, it is preferred that bag 8 be opaque or at least semi-opaque. To unlock and remove the secure bag assembly 100 from the cassette 6, the user pulls the strap 32 via handle 1.

Figure 4:
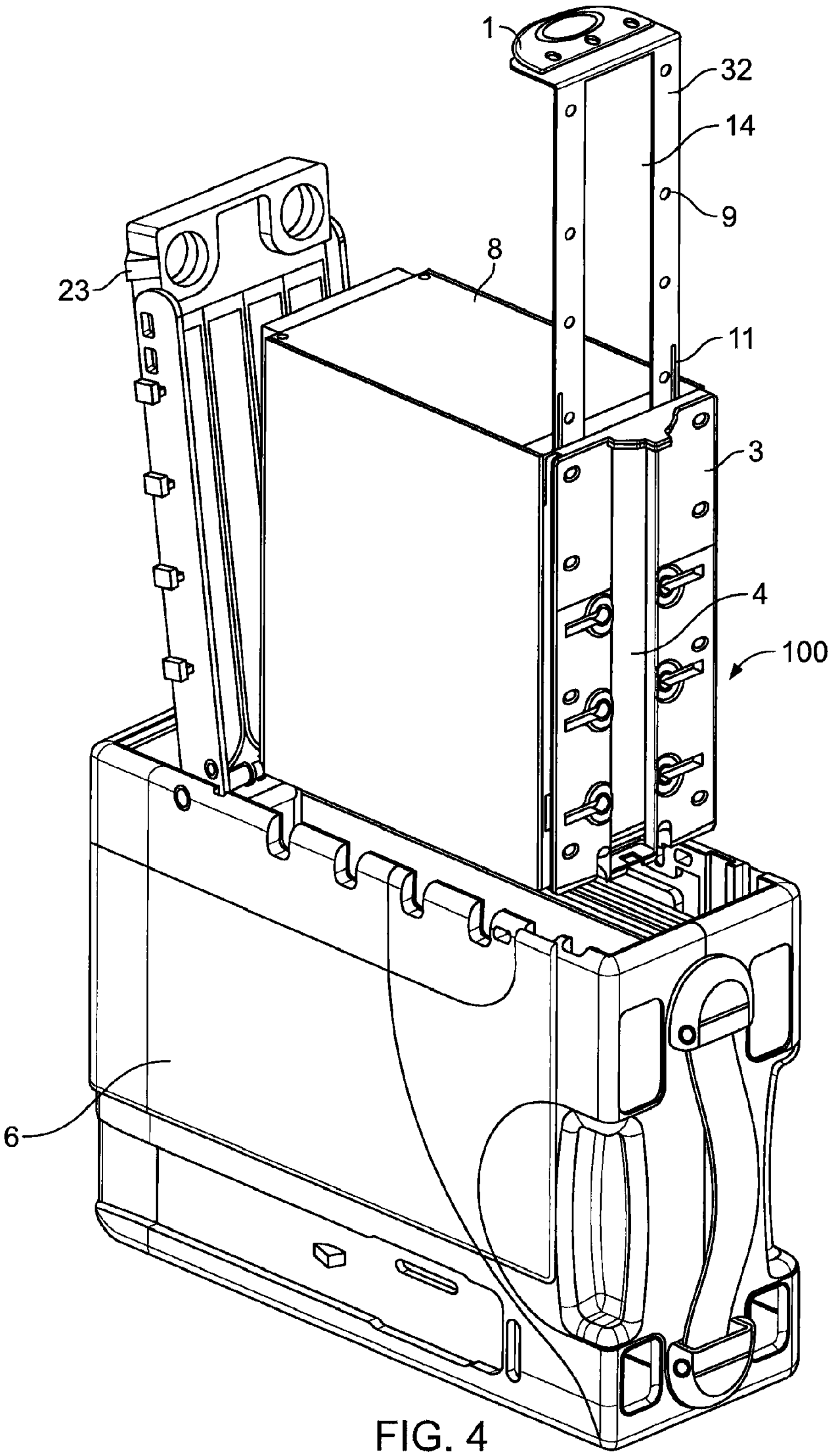
FIG. 4 is a view of a secure bag assembly, filled with bills, removed from a cassette.

FIG. 4 illustrates the secure bag assembly 100 removed from the cassette 6. As will be discussed in more detail below, the strap 32 is configured such that once it is pulled to the extent needed to unlock and remove the assembly 100 from the cassette 6, a solid portion of the strap 32 completely blocks access to the cash via the aperture plate opening 4 (i.e., the bill path opening). Accordingly, once removed, the contents of bag 8 cannot be accessed without leaving visible evidence of tampering with the secure bag assembly 100.

Although the stacker assembly 16 is shown installed inside the cassette 6, this is not mandatory. In other implementations, the stacker assembly 16 can be outside the cassette 6. In such a configuration, the stacker assembly 16 would feed documents into the cassette 6 via an aperture on the outside of the cassette 6.

Assembly Details

Figure 5:
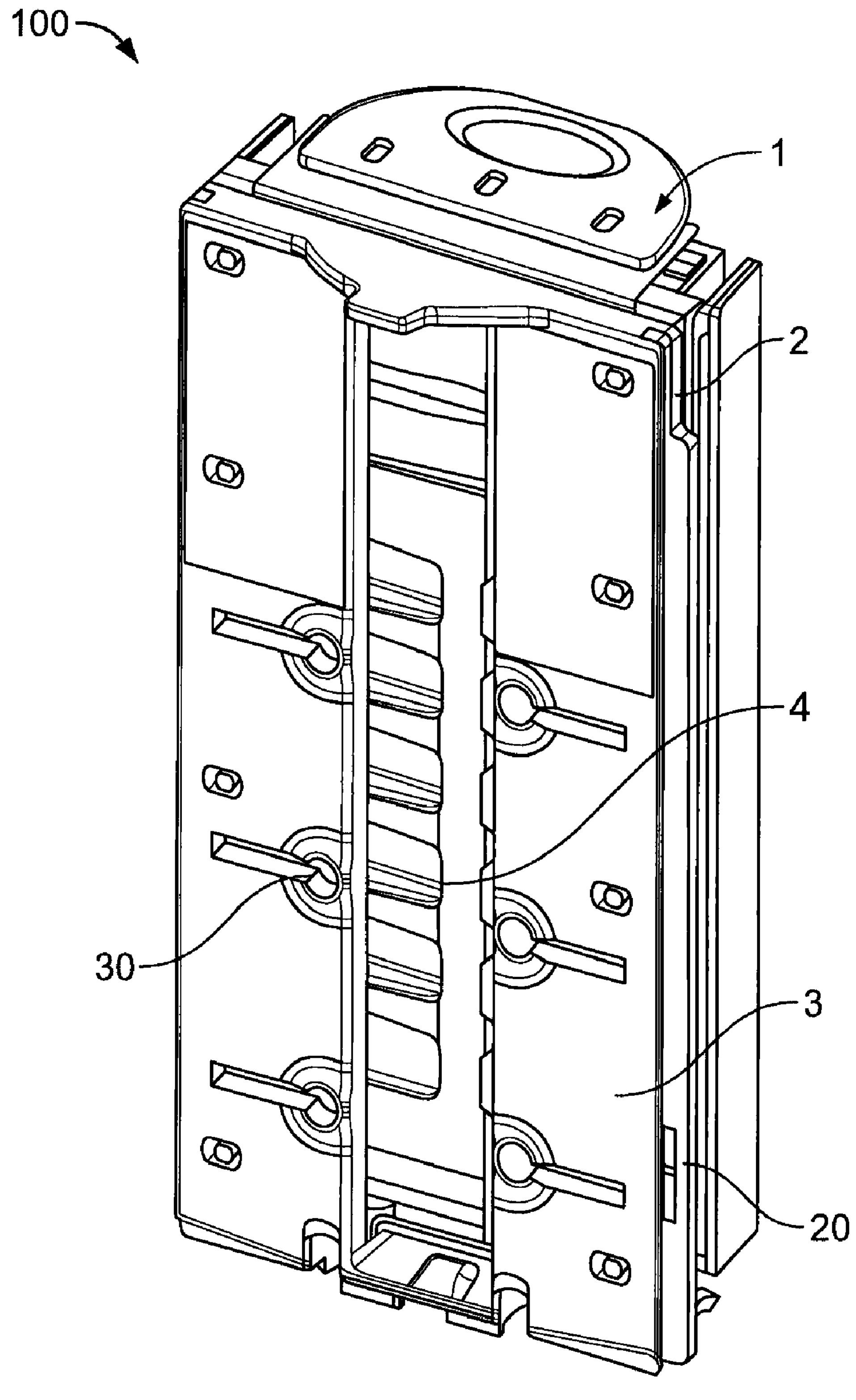
FIG. 5 is a front view of a secure bag assembly before installation into a cassette.

FIG. 5 illustrates an implementation of a secure bag assembly 100 in the flat, pre-installed state. In this view, several components of the assembly 100 are visible. The assembly 100 is oriented such that when it is installed in a cassette, the aperture plate 3 is disposed adjacent to the stacker assembly. This orientation is preferred because aperture plate 3 comprises an aperture opening 4 that serves as part of the bill path. As such, the aperture opening 4 is the bill path opening that receives bills passed from the stacker assembly, which is the component of the cassette 6 that stacks the validated bills. This can be accomplished by using a pusher plate (see, e.g., FIGS. 10 and 12, item 18) that pushes bills through an aperture. In this implementation, bills are passed from the validator through the aperture opening 4 via a pusher plate 18 of a stacker assembly 16. The stacker assembly is discussed in more detail with respect to FIGS. 10-12.

The aperture plate may be made part of the front subassembly, or remain integrated in the cassette. In the illustrated implementation, the aperture plate 3 includes side rails 2 and mating features 20. Side rails 2 mate with stacker transport side rails 17 (see FIGS. 10-12) for mounting the bag assembly 100 into the cassette, whereas mating features 20 mate with features 21 on the stacker assembly 16 and contribute to locking the assembly 100 in place. Preferably, the secure bag assembly 100 cannot be unlocked from the cassette 6 unless the strap 32 is pulled via strap handle 1. Bill path spheres 30 (six of which are present in this implementation) act as ball bearings that assist transport of bills as they are transported from the bill acceptor (not shown) into the stacker portion of the cassette 6.

Prior to receiving any bills, the assembly 100 should be held in a substantially flat configuration to prevent premature expansion of the bag 8. A retaining clip 31 integral to the backplate 5 (see FIGS. 6, 8 and 9) holds the assembly 100 in such a fashion. The first note that is stacked will free (release) the clips with no substantial added force from the stacker pusher plate 18. This feature is discussed in more detail with respect to FIG. 9.

Figure 6:
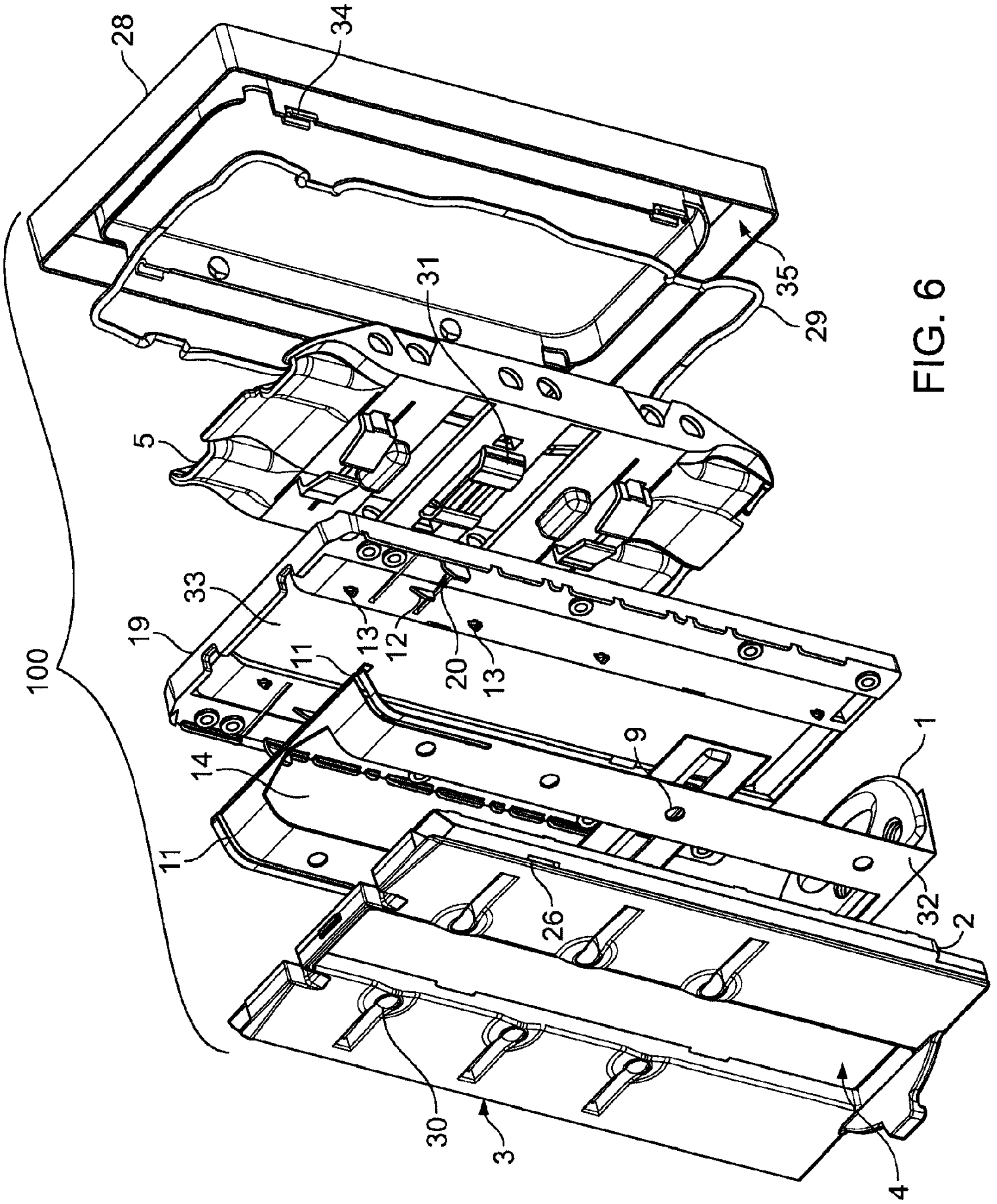
FIG. 6 is an exploded view of a secure bag assembly.

FIG. 6 is an exploded view of the secure bag assembly 100. For clearer illustration of the components, the bag 8 is not shown. Aside from the bag 8, the major components of the assembly 100 include aperture plate 3, strap 32 (only a portion of which is illustrated), finger plate 19, backplate 5 and bottom backplate 28. Some of these components are grouped together into two main subassemblies: the front subassembly and the back subassembly. The front subassembly includes the aperture plate 3 and finger plate 19. The back subassembly includes backplate 5 and bottom backplate 28. Although not shown in FIG. 6, the bag 8 surrounds the back subassembly and is affixed (e.g., by ultrasonic welding, adhesive or fasteners) to aperture plate 3 and/or finger plate 19.

Plates 3, 5, 19 and 28 can be made from a variety of different materials, including, e.g., an injection-molded polymer. It is possible to make the assembly 100 for single-use only. In such an implementation, it is desirable to minimize material and assembly cost. Alternatively, the assembly 100 can be made such that the bag 8 can be replaced after each use. In that implementation, durable materials are preferred.

A portion of the strap 32 is disposed between the aperture plate 3 and the finger plate 19. Before it is pulled, the strap aperture 14 lines up with aperture opening 4 of aperture plate 3. This alignment permits bills to pass through aperture opening 4 and into the bag 8. After the strap 32 is pulled, a solid (preferably inelastic) portion of the strap blocks the aperture opening 4 (see FIG. 4), thereby securing the contents of the bag 8.

To provide greater security, strap 32 includes one-way locking features 9. In this implementation, the locking features 9 are holes that align with locking fingers 13 of finger plate 19. The combination of locking features 9 and locking fingers 13 allow only unidirectional movement of the strap 32. Therefore, once the strap 32 has been pulled and the aperture opening 4 sealed, the strap 32 cannot be moved backward to gain access to the bag 8 contents. Also, the strap 32 includes channels 11 which mate with lock release 12. When the channels 11 end, a solid portion of the strap depresses (i.e., triggers) the lock release 12 causing the secure bag assembly 100 to unlock from the cassette 6. These locking and unlocking features are discussed in greater detail with reference to FIG. 13.

Finger plate 19 includes a finger plate aperture 33 that aligns with the aperture opening 4 of aperture plate 3. This alignment, combined with the alignment of the strap aperture 14, allows bills to pass into the bag 8. In this implementation, the assembly of the aperture plate 4 and finger plate 19 forms a front subassembly that is forms a side of the bill transport path. In the illustrated implementation, without the secure bag assembly 100 installed, reliable bill transport into the cassette 6 is not possible. In operation, the front subassembly is functionally similar to a standard aperture plate used in a standard stacker assembly. While in this implementation the aperture plate 3 is made part of the front subassembly, other implementations are possible in which the standard aperture plate remains a part of the stacker assembly, and the front subassembly mates with the stacker aperture plate. However, making the aperture plate part of the front subassembly is advantageous because it can reduce the combined overall thickness of the stacker assembly and bag assembly 100, thereby allowing greater bill storage capacity in the cassette 6.

The finger plate 19 couples to the aperture plate 3 by the mating of stacker locks 20 and aperture plate lock cutout 26. The aperture lock cutout 26 and stacker locks 20 increase the tamper resistance of the assembly because they prevent separating the finger plate 19 from the aperture plate 3 without visibly damaging the assembly 100. Other means may be used to couple the aperture plate 3 and finger plate 19, including adhesives.

Figure 9:
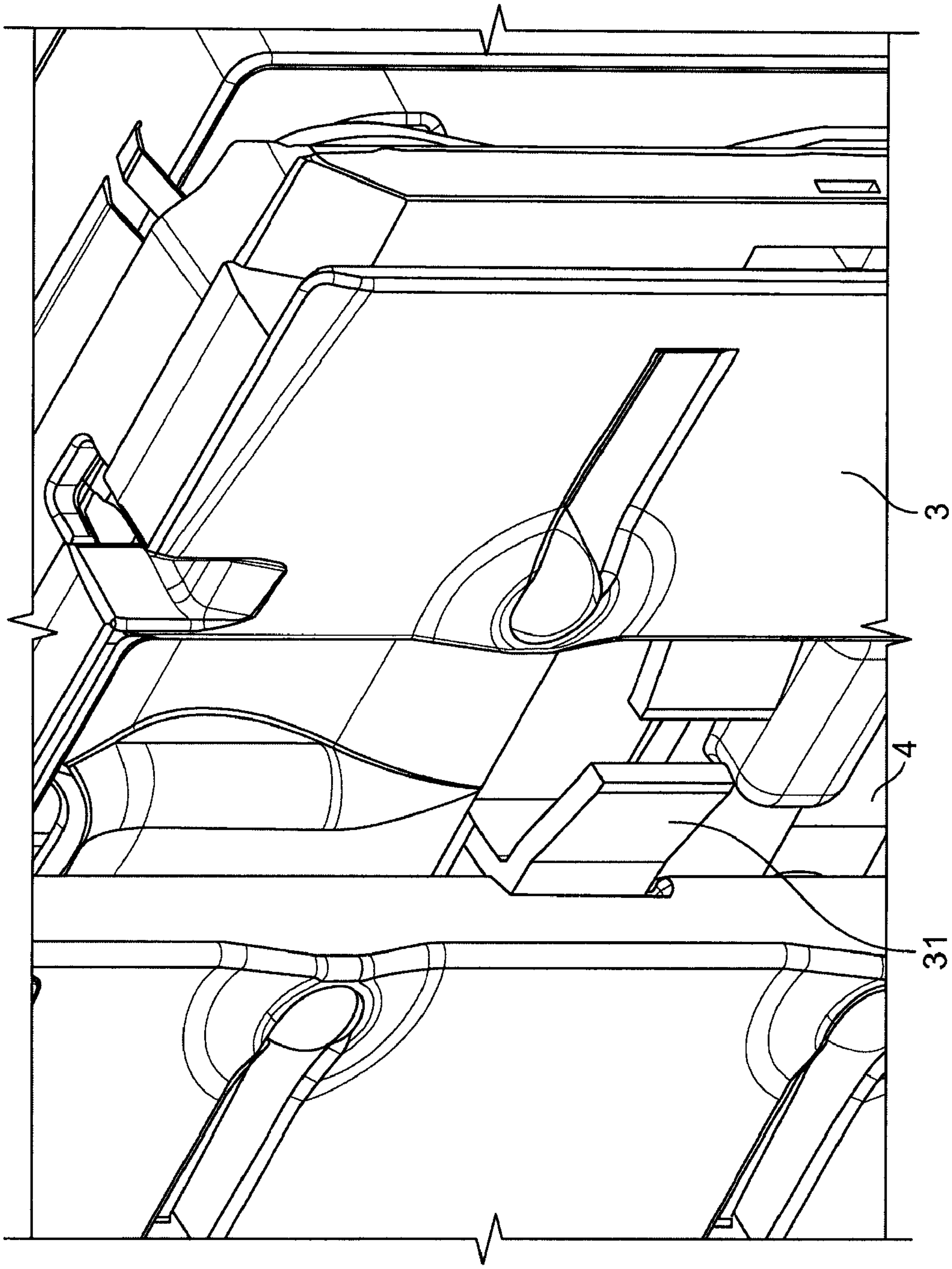
FIG. 9 is a view of the retaining clip of the secure bag assembly.
Figure 10:
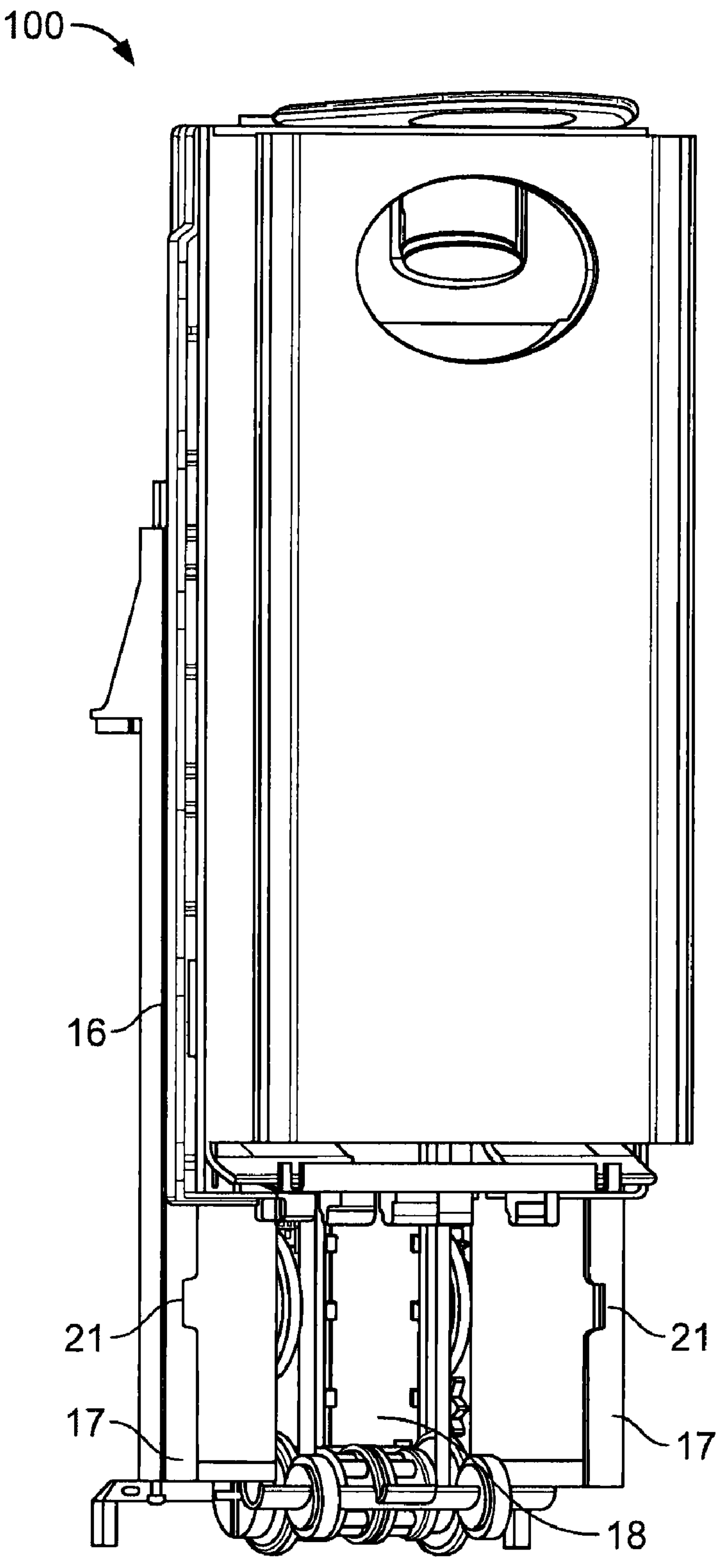
FIG. 10 is view of a secure bag assembly being coupled to a stacker assembly.
Figure 12:
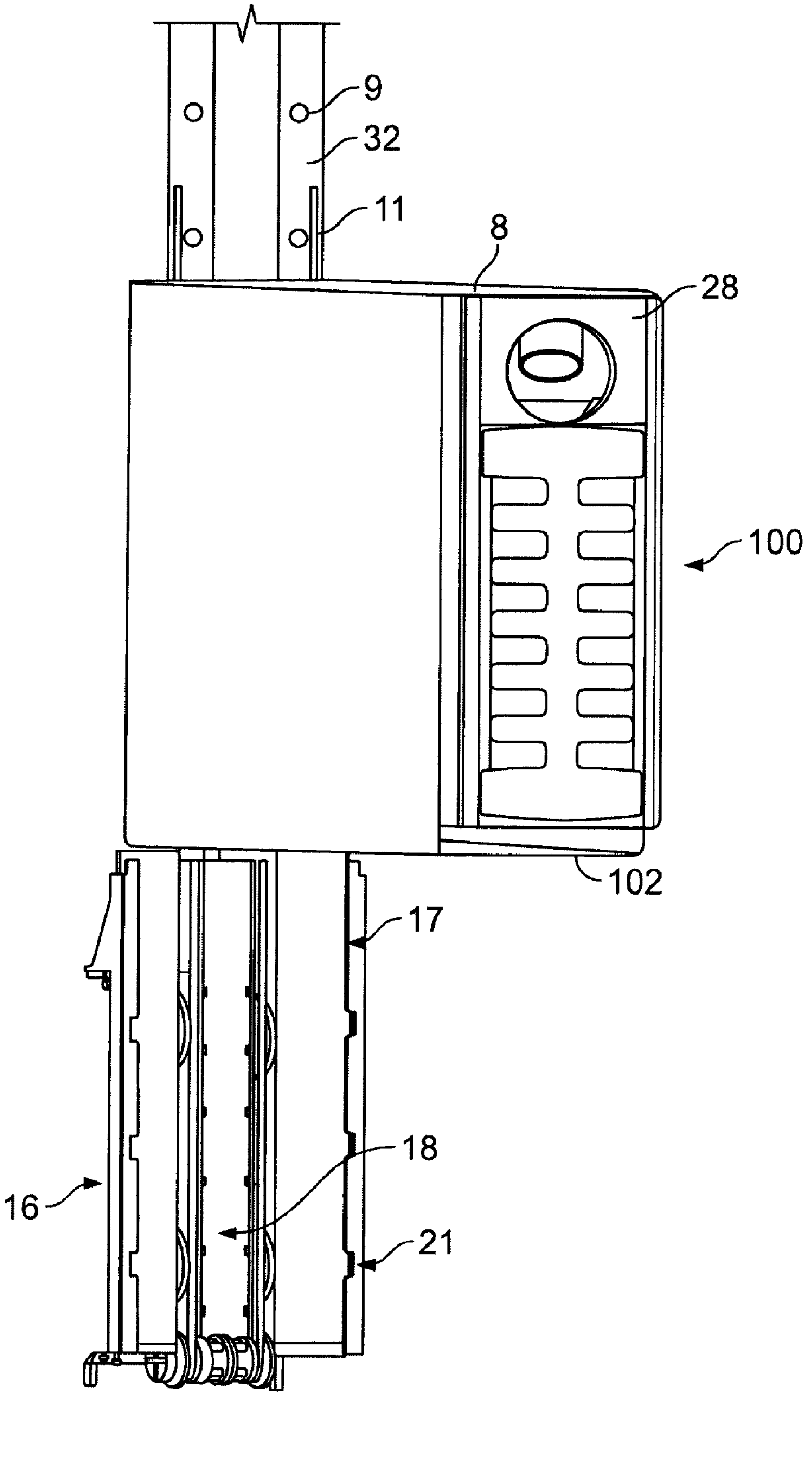
FIG. 12 is an alternate view of a secure bag assembly being removed from a stacker assembly.

Backplate 5 includes a retaining clip 31 that mates with the portion of the aperture plate 3 that defines the aperture opening 4 to attach the front subassembly and back subassembly together until a bill is loaded, e.g., by a pusher plate 18 (see FIGS. 10 and 12). After the pusher plate 18 dislodges the retaining clip 31 from aperture opening 4, the bag 8 is free to expand. In its pre-installed state, however, the front and back subassemblies are connected together as illustrated, e.g., in FIGS. 1 and 5. After the retaining clip is dislodged, the connection between the back subassembly (including backplate 5 and bottom backplate 28) and the front subassembly (including aperture plate 3 and finger plate 19) is broken, and they are separated by the bag 8 and the bill(s) contained therein. The retaining clip is discussed in more detail with respect to FIG. 9.

Backplate 5 is coupled to the bottom backplate 28 by the bottom backplate coupling features 34. The bag hold down 29 contributes to fastening the bag to the backplate 5 and bottom backplate 28. Prior to its expansion, some of the bag 8 is stored in the bag storage region 35, which includes the space between the inner and outer walls of the bottom backplate 28.

Figure 7:
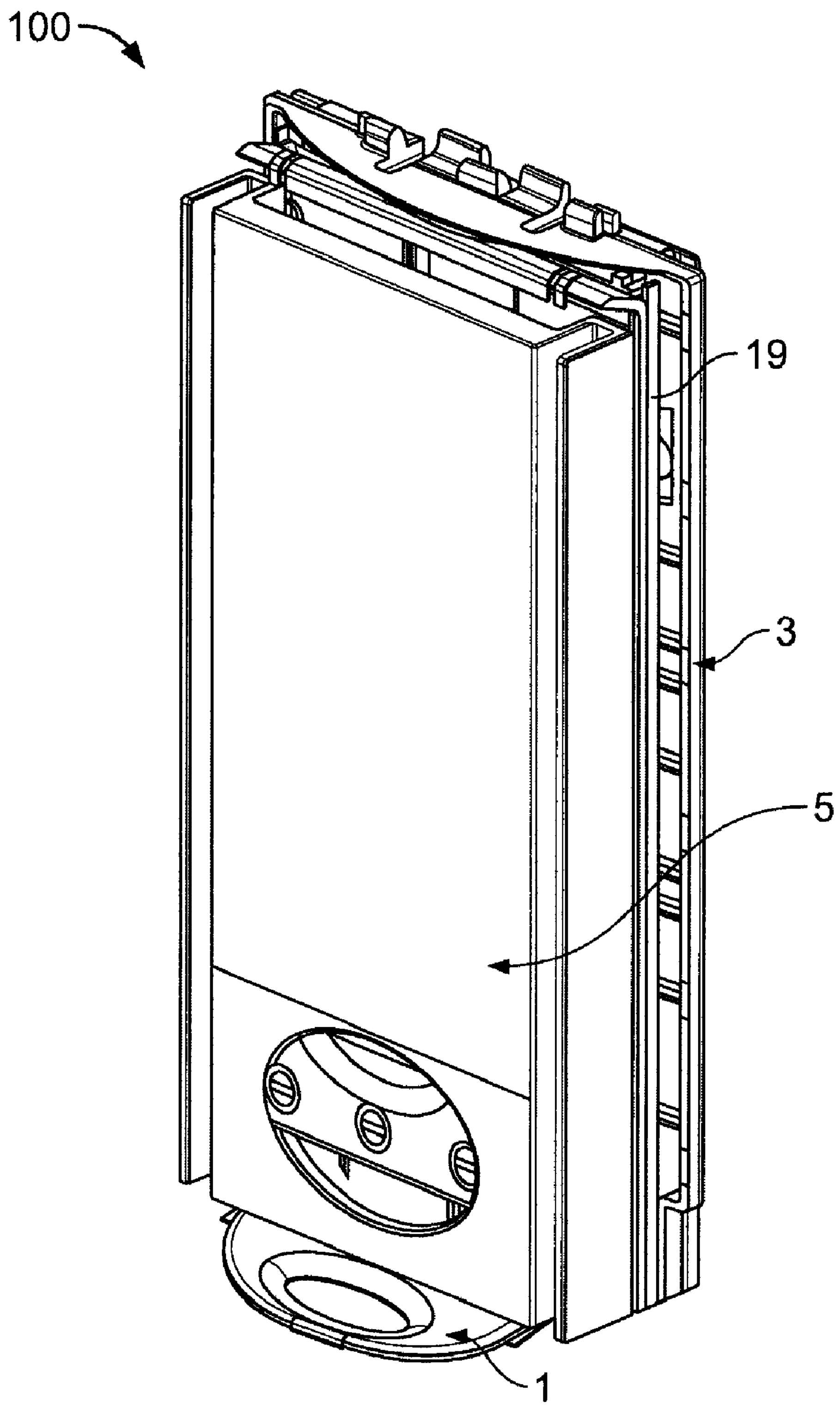
FIG. 7 is a rear view of a secure bag assembly before installation into a cassette.

FIG. 7 depicts an alternate view of secure bag assembly 100 in the flat, pre-installed state. The bag 8 is omitted for clarity. In this view, the rear of the backplate 5 is visible. When a bag is installed, it surrounds the backplate 5, and is affixed to the aperture plate 3 and/or finger plate 19.

Figure 8:
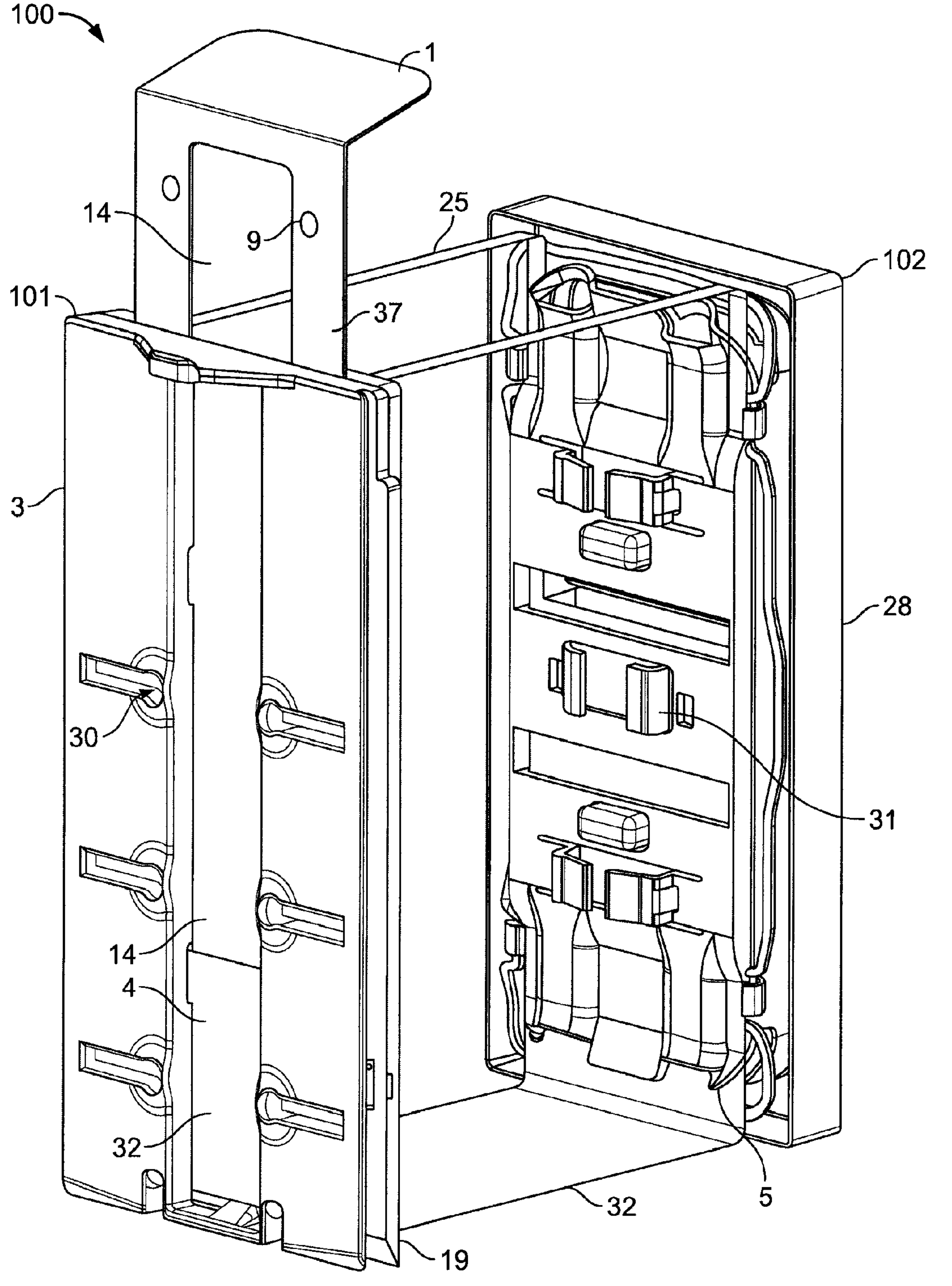
FIG. 8 is a perspective view of a secure bag assembly.

FIG. 8 illustrates the front and back assemblies separated. The bag 8 is omitted for clarity, but would surround the back subassembly 102, with the open end of the bag meeting the sides of the front subassembly 101. As the strap 32 is pulled upward, the strap aperture 14 moves upward as well, and a solid (preferably inelastic) portion of the strap 32 begins to block the aperture plate opening 4. Accordingly, once the strap 32 is pulled sufficiently upward, access to the bag 8 via the aperture plate opening 4 is prevented. It is preferred that the assembly 100 cannot be removed from a cassette until the strap 32 blocks aperture 4, thereby preventing access to the contents of the bag 8 before it is released from the cassette.

The strap 32 is preferably a continuous member and includes three major components: (1) a handle 1 used for pulling the strap upward (i.e., for removing the assembly 100 from a cassette and blocking access to the contents of the bag 8), (2) an inelastic portion 37 connected to handle 1, and disposed at least in the space between the aperture plate 3 and finger plate 19 and some of the distance between the lower edges of the front and back subassemblies and (3) an elastic portion 25 that extends at least some of the distance between the upper edges of the front and back subassemblies, that is connected to the inelastic portion 37, and is further connected to the front subassembly 101. The inelastic portion 37 can be made of various materials having limited elasticity including, for example, biaxially-oriented polyethylene terephthalate (boPET) polyester film (also known as Mylar® material). The elastic portion 25 can be made of any of a variety of flexible materials including rubbers, plastics (both thermoplastics and thermosets), polymers and/or elastomers.

Because the strap 32 loops around the contents of the bag 8, passes through the back subassembly and is connected to the front subassembly, pulling the strap 32 securely binds the contents of the bag 8 between the front and back subassemblies. The strap 32 is made to secure the stack of bills in a tight, bundle-like manner. When the bag 8 is in the flat (empty and near empty) condition the remainder of the strap is stored in a folded condition and housed in the back subassembly. At a point roughly midway to a full stack of bills, the elastic portion 25 of the strap 32 begins to stretch. The elastic portion 25 of the strap 32 continues to stretch to the point where the bag 8 is full. The elasticity of the elastic portion 25 contributes to securing the stack of bills in a tight, bundle-like manner.

Installing the Bag Assembly 100 into a Cassette

FIG. 1 illustrates a secure bag assembly 100 about to be installed into cassette 6. A stacker mechanism 16 is disposed inside the cassette 6 (see FIGS. 10-12), and is used to feed the bills into the secure bag assembly 100. After opening the cassette door 23, the secure bag assembly 100 is installed in the cassette 6 at a position adjacent to the stacker mechanism. As shown, the secure bag assembly 100 has side rails 2 that mate with the stacker transport side rails 17. The transport side rails 17 guide the insertion of the assembly 100 into the cassette 6.

FIG. 2A depicts the secure bag assembly 100 installed into cassette 6. As illustrated, the assembly 100 is installed while it is in the flat condition (see, e.g., FIG. 5). The assembly 100 is pushed into the cassette 6 until the bottom of the assembly 100 makes contact with the inside bottom of the cassette 6. At the point of contact, stacker locks 20 (see, e.g., FIGS. 6 and 13) lock into stacker mating features 21 (see FIGS. 10 and 12) to prevent the assembly from being pulled out. Once the assembly 100 is installed, the cassette door 23 can be closed and connected to a bill acceptor. The bag portion 8 of the assembly 100 extends, as bills are stacked in the cassette 6, such that substantially all of the cassette storage area 36 is utilized for bill storage.

However, before the bag portion of the assembly 100 can extend, the front subassembly and back subassembly must be separated from each other. As discussed in connection with FIG. 6, retaining clip 31 of backplate 5 couples to aperture 4 to keep the assembly 100 substantially flat. This is illustrated in detail in FIG. 9. Retaining clip 31 is press fit into aperture 4 of aperture plate 3. To disconnect the front and back subassemblies, the pusher plate 18 (see, e.g., FIGS. 10 and 12) pushes upon retaining clip 31 when it loads the first bill into the bag 8. This causes the two tabs of the retaining clip 31 to approach each other, causing the clip 31 to narrow and disconnect from the walls of aperture 4. Therefore, the front and back subassemblies (101 and 102, respectively) become separated, and the bag 8 can expand to fill cassette storage area 36. In other implementations, different types of clips or tabs can be used. For example, a flexible tab could extend from the back subassembly 102 and lock to a surface on the front subassembly 101. The force from the pusher plate 18 causes the flexible tab to deform enough to release the front and rear subassemblies.

To clearly illustrate the coupling of the assembly 100 to the stacker assembly 16, FIG. 10 omits the remainder of the cassette. The stacker assembly 16, which typically is a component of the cassette 6, has transport side rails 17 that couple with assembly side rails 2 (see, e.g., FIGS. 1 and 10-12). Mating features 20 on the aperture plate 3 (see, e.g., FIGS. 10 and 12) mate with locking features 21 to keep the assembly 100 in place and aligned until the strap 32 is pulled and the assembly 100 is removed. The assembly 100 and stacking mechanism 16 preferably are aligned securely because for bills to be fed into the assembly 100, the pusher plate 18 must be adequately aligned with the aperture plate opening 4.

In some implementations, if the bill is properly validated in the acceptor portion of the bill validator, the bill is transported from the acceptor portion (not shown) lengthwise during transport into the cassette, with the flat surface of the bill parallel to the face of the aperture plate 3. The bill is then pushed through the aperture plate opening 4 by the stacker pusher plate 18. The first bill fed into the assembly will come in contact with the backplate 5, and each subsequent bill is stacked on the previously stacked bill. During stacking, the bill conforms to the size of the aperture plate opening 4, resulting in a temporary tri-fold shape. When the lengthwise trailing ends of the bill clear the aperture plate opening 4, the bill springs back to the flat shape. A spring (and spring-like force from the bag 8) in the cassette 6 exerts a constant force opposite the stacker pusher plate 18. The pressure exerted by the spring helps to restore the bill to its flat shape and also presses the bill (or stack of bills) against the back of the finger plate 19. The bag 8 will stretch with each stroke of stacker pusher plate 18 and will return to the starting position (plus one bill thickness) with each cycle.

Removing the Assembly from a Cassette

FIG. 3 illustrates an installed secure bag assembly 100 in which the bag 8 is full, and has expanded into substantially the entire cassette currency storage area. Once the bag 8 is full, it is usually desirable to remove the assembly 100 from the cassette 6 and replace it with a new, empty assembly 100. However, the assembly 100 can be removed from the cassette 6 at any point, even if the bag 8 is empty or only partially full.

After the user removes the cassette 6 from the bill validator, the cassette door 23 is opened to gain access to the secure bag assembly 100. No cash is visible, only the bag 8 (which is preferably at least semi-opaque). To remove the assembly from the cassette 6, the user pulls the strap 32 upward via handle 1, as shown in FIG. 3 (see also FIG. 8). As a result, the strap aperture 14 is now visible. As the strap aperture 14 has been pulled past the aperture plate opening 4 and the finger plate aperture 33 (which remain adjacent to the stacker assembly 16 in cassette 6), a solid portion of the strap 32 now blocks access to the contents of the bag 8. Thus, when pulled to the extended position, a portion of the strap 32 serves as a sealing means that closes the aperture opening 4. After the solid portion of the strap 32 has completely blocked access to the contents of the bag 8, unlocking features 11 on the strap 32 and front subassembly 101 allow removal of the assembly 100 from the cassette 6.

In some implementations, instead of the strap 32, the sealing means includes sliding lateral doors, a key plate or a flexible film plate. Further details of those implementations are discussed below.

FIG. 4 illustrates the assembly 100 removed from the cassette 6. The solid portion of the strap 32 is shown completely blocking access through the aperture plate opening 4. Accordingly, once removed, the contents of bag 8 cannot be accessed without leaving visible evidence of tampering with the assembly 100.

Figure 11:
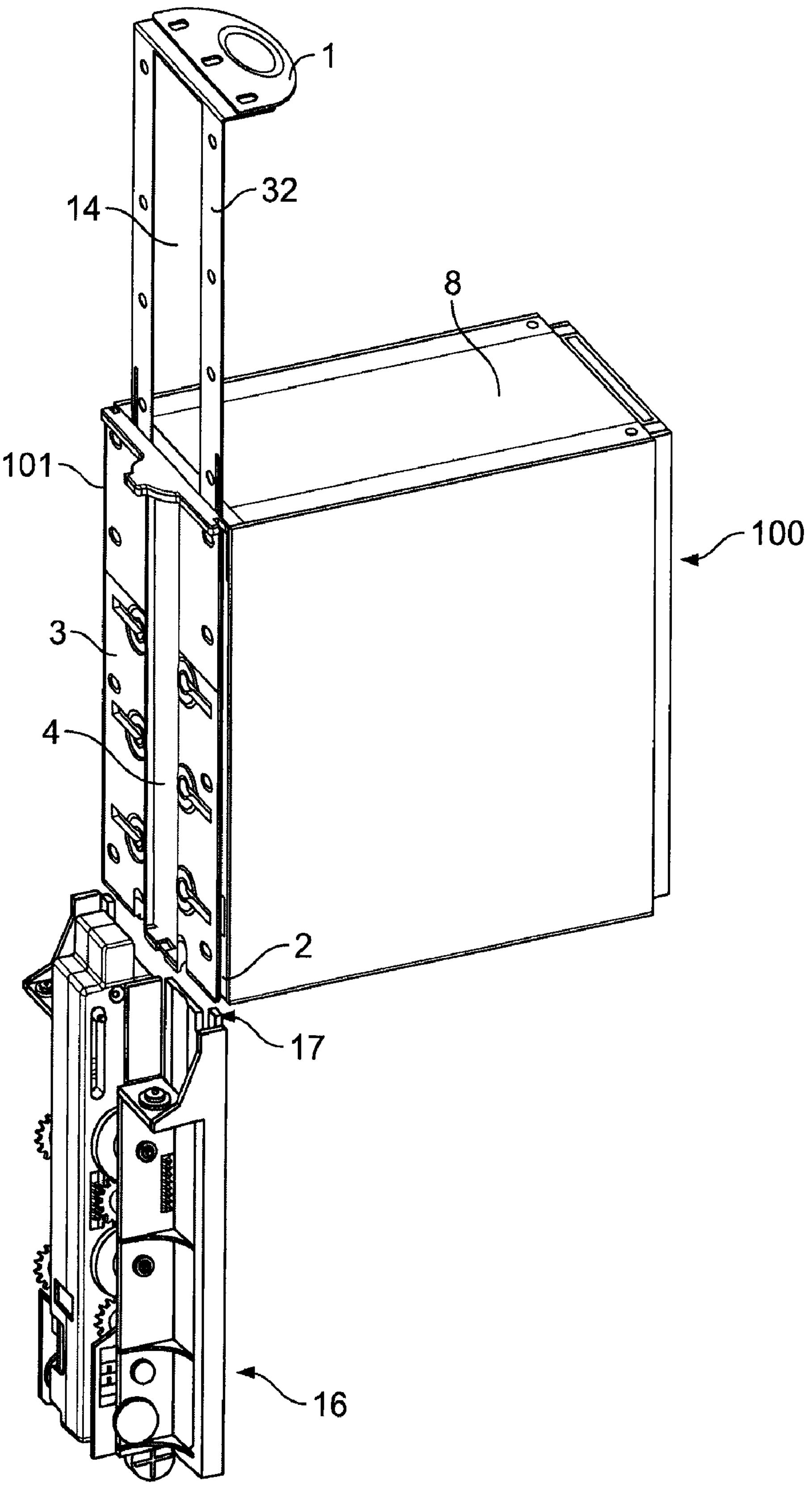
FIG. 11 is a view of a secure bag assembly being removed from a stacker assembly.

To further illustrate the relationship between the secure bag assembly 100 and the stacker assembly 16, FIGS. 11 and 12 omit the remainder of the cassette 6 and illustrate a removed assembly 100 along with the stacker assembly 16. FIG. 11 illustrates the side rails 2 of the assembly 100 and the stacker transport side rails 17. Side rails 2 and stacker transport side rails 17 mate with each other to securely mount the assembly 100 to the stacker assembly 16.

FIG. 12 illustrates the secure bag assembly 100 and stacker assembly 16 as in FIG. 11, but the view is facing the back subassembly 102. From this perspective, the cassette transport locking features 21 on the stacker assembly 16 are visible. These features 21 mate with aperture plate mating features 20 (see, e.g., FIGS. 5 and 6). In one implementation, the aperture plate mating features 20 are flexible locking tabs that mate with features 21 (e.g., slots) in the stacker transport side rails 17. These features 20 and 21 have the following functions. First, they contribute to securely mounting the assembly 100 to the stacker assembly 16. Features 20 and 21 preferably cannot be decoupled unless the strap 32 is fully pulled, thereby preventing access to the contents of the bag 8 before releasing the assembly 100. Second, features 20 and 21 securely align the aperture plate opening 4 (and the remainder of the bill path associated with the front subassembly) with the pusher plate 18. This alignment of the bill path enables the pusher plate 18 to loads bills into the assembly 100.

Locking Features

Figure 13:
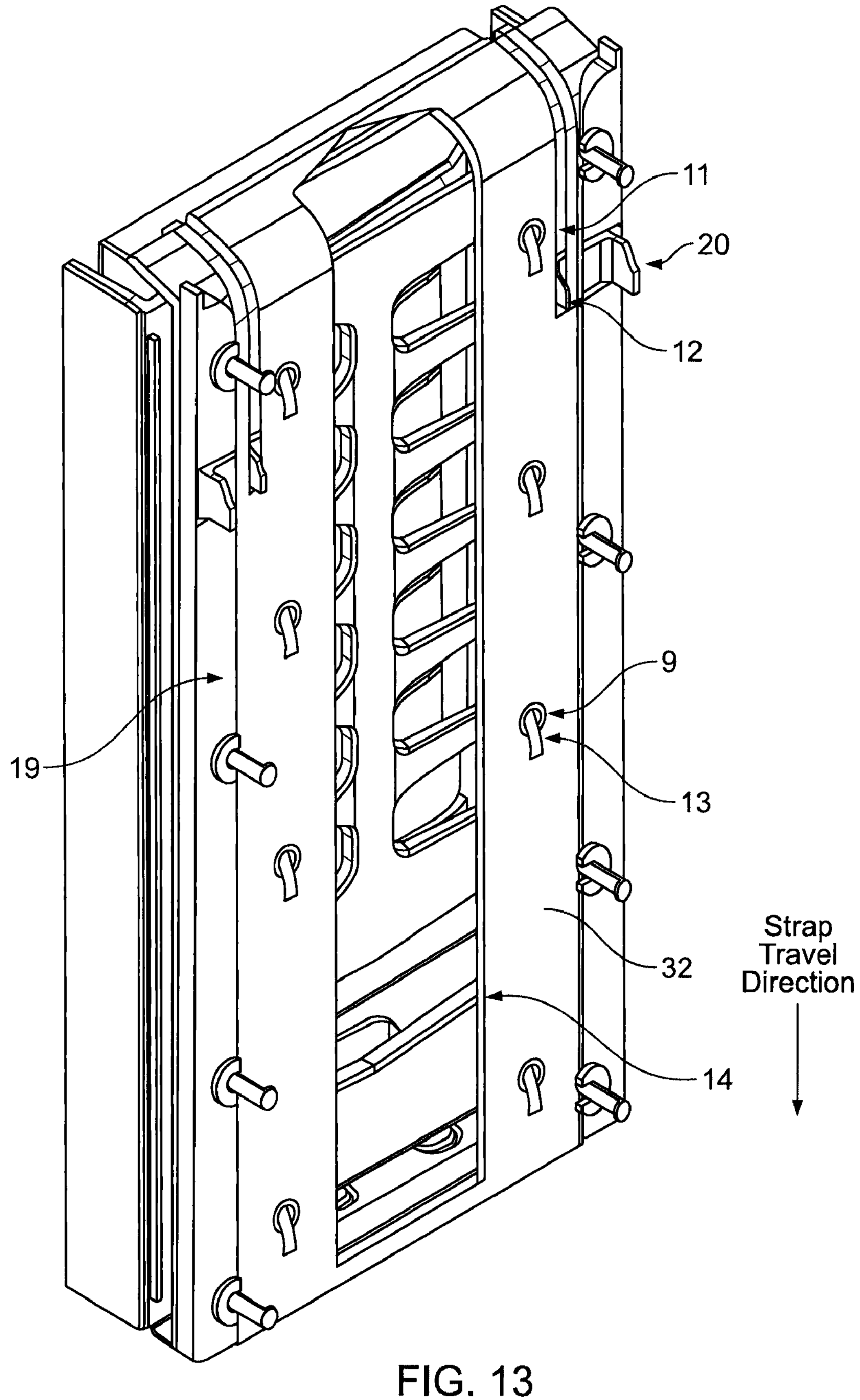
FIG. 13 is a view of locking features on the strap and finger plate of the secure bag assembly.

FIG. 13 depicts the finger plate 19, strap 32 and examples of various locking features. The aperture plate 3 is not shown to better illustrate the locking features. The stacker locks 20 are integral to the finger plate 19 and act in a spring-like fashion using the flexural properties of the finger plate 19. If the finger plate 19 is not made of a flexible material, stacker locks 20 can be made of a different material than the finger plate 19. Once the stacker locks 20 are engaged with the mating features 21 on the stacker assembly 16 (see, e.g., FIGS. 10 and 12), the assembly 100 cannot be removed from the cassette 6 without either pulling the strap 32 though normal operation or forcibly removing the aperture plate 3 or finger plate 13, thereby leaving tamper-evident marks. To remove the assembly 100 under normal operation, the strap 32 is pulled (i.e., via handle 1 in FIG. 2A) in the direction indicated. This causes the strap channels 11 to ride along the lock release 12. Once the channel 11 ends, the strap 32 will press on the lock release 12 and free stacker locks 20 from the mating features 21 on the stacker assembly 16. As the stacker locks 20 are unlocked, the aperture opening 4 is fully closed by a solid portion of the strap 32.

In the illustrated implementation, the strap 32 may move only in the direction that seals the aperture 4. The strap 32 can move only in the sealing direction as a result of to the fingers 13, holes 9 in the strap 32 and the lock release 12 on the aperture plate 3. The fingers 13 prevent the strap from being pulled against the sealing direction. The strap 32 is flexible enough to glide over the fingers 13 due to the angle of the fingers protruding from the finger plate 19. But if the strap 32 is moved in the opposite direction (e.g., in an attempt to unseal the aperture 4), the fingers 13 are at such an angle that the holes 9 will get caught on the fingers 13 preventing travel in the opposite direction. Thus, once the strap 32 is pulled and seals the aperture 4, the aperture 4 cannot be unsealed. At that point, the only way to access the contents of the bag 8 is by cutting it open or otherwise tampering with the assembly 100 in a manner that would leave visible evidence.

Upgrading an Existing Cassette

As mentioned earlier, existing cassettes typically include a stacker mechanism with an aperture plate. Since some implementations of the secure bag assembly 100 include an aperture plate 3 that functionally replaces the aperture plate of a standard cassette, some modifications to existing cassettes may be needed to accommodate the secure bag assembly 100.

Generally, the cassette modifications stem from integrating some aperture plate features into the cassette, while at the same time removing the aperture plate itself. Rail notches (e.g., locking features 21) are added to the cassette to lock the assembly 100 into the stacker assembly 16. These notches hold the assembly 100 in place during operation. Also, the shaft and wheels that are normally an integral part of the bill path transition from the bill acceptor to the cassette are incorporated into the cassette housing.

Because the front subassembly forms a part of the bill transport path as the bill is transported from the acceptor to the cassette, a sensor can be used to check that the assembly 100 is fully inserted into the rails (e.g., stacker transport side rails 17) and locked in place. Existing sensor systems found in some cassettes can be used to verify correct installation. When the cassette is installed in the validator, it will sense the presence of the cassette and secure bag assembly 100.

As mentioned above, in some implementations, instead of the strap 32, the sealing means includes sliding lateral doors, a key plate or a flexible film plate. Details of those implementations are discussed in the following paragraphs.

Implementation with Sliding Lateral Doors

Figure 14B:
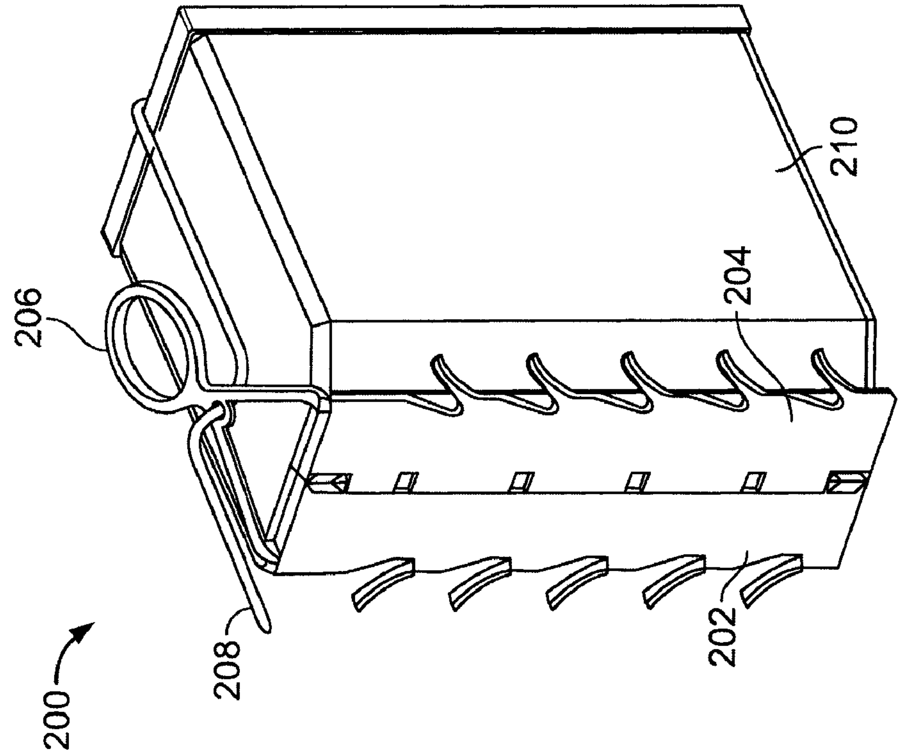
FIGS. 14-19 illustrate views of an implementation that incorporates sliding lateral doors to seal the opening of the assembly.
Figure 14A:
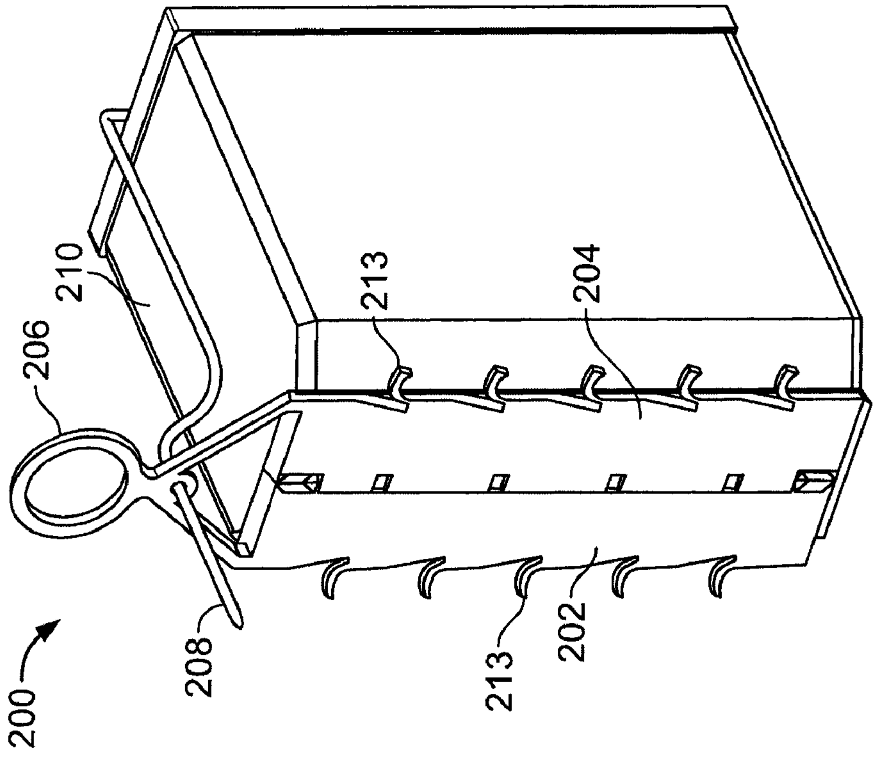

As illustrated in FIGS. 14A and 14B, some implementations of a secure bag assembly 200 include sliding lateral doors 202, 204 coupled to a handle 206. Upon being pulled, the handle 206 causes the sliding lateral doors to approach one another and seal the aperture opening through which bills or other documents of value are received. Upon sealing the aperture opening, the handle 206 causes the assembly 200 to unlock from the stacker assembly. The sliding lateral doors 202, 204 lock to one another upon sealing the aperture opening, thereby securing the contents of the container. The handle 206 can be folded back, as shown in FIG. 14B, and secured by a tie wrap 208 to maintain the bag portion 210 of the assembly in a compact shape.

As in the implementation describe above, the soft bag 210 can be made of an expandable material such as mesh cloth, plastic or paper packed or folded on itself in accordion-like shape, for example, so as to reduce the volume taken when the bag is empty or only partly filled. The bag 210 can be made, for example, of elastic fabric or pliable material or a mix of the two where some sections are elastic and other sections are only of a pliable material.

Figure 15B:
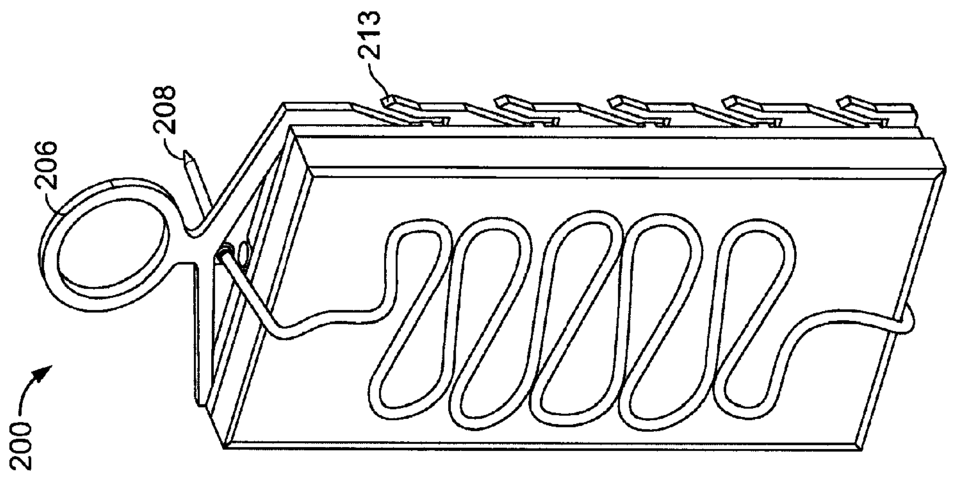
Figure 15A:
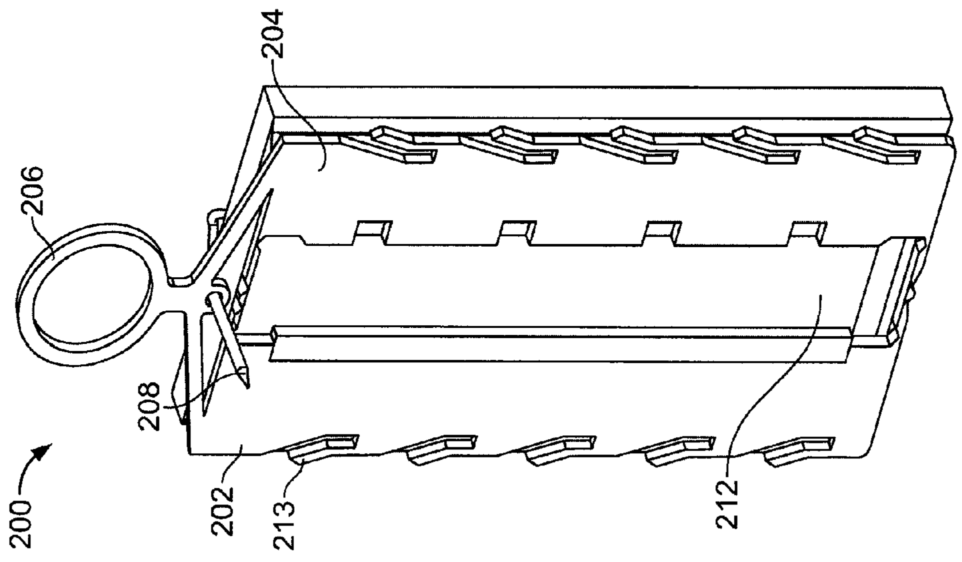

FIGS. 15A and 15B illustrate front and back views, respectively, of the bag assembly 200 prior to installation in a currency cassette. The sliding lateral doors 202, 204 are shown in their open positions, allowing access to the aperture opening 212 through which bills or other documents of value are received.

To install the bag into a currency cassette, the collapsible framing door structure of the bag assembly 200 slides into a railing guide in a stacker plate that forms part of the stacker assembly. The framing door structure includes flexible push arms 213 that lock in openings in the railing guide of the stacker plate so as to lock the bag assembly 200 in place. When the bag assembly 200 is fully inserted into the currency cassette, the opening 212 aligns with a similar opening in the stacker plate.

The push arms 213 should be flexible with enough spring effect to snap into locking position when the bag assembly is inserted into the currency cassette, and rigid enough to push the door panes 202, 204 closed as the assembly is removed and to allow elastic deformation for bending to allow complete removal of the bag assembly from the cassette.

Figure 16:
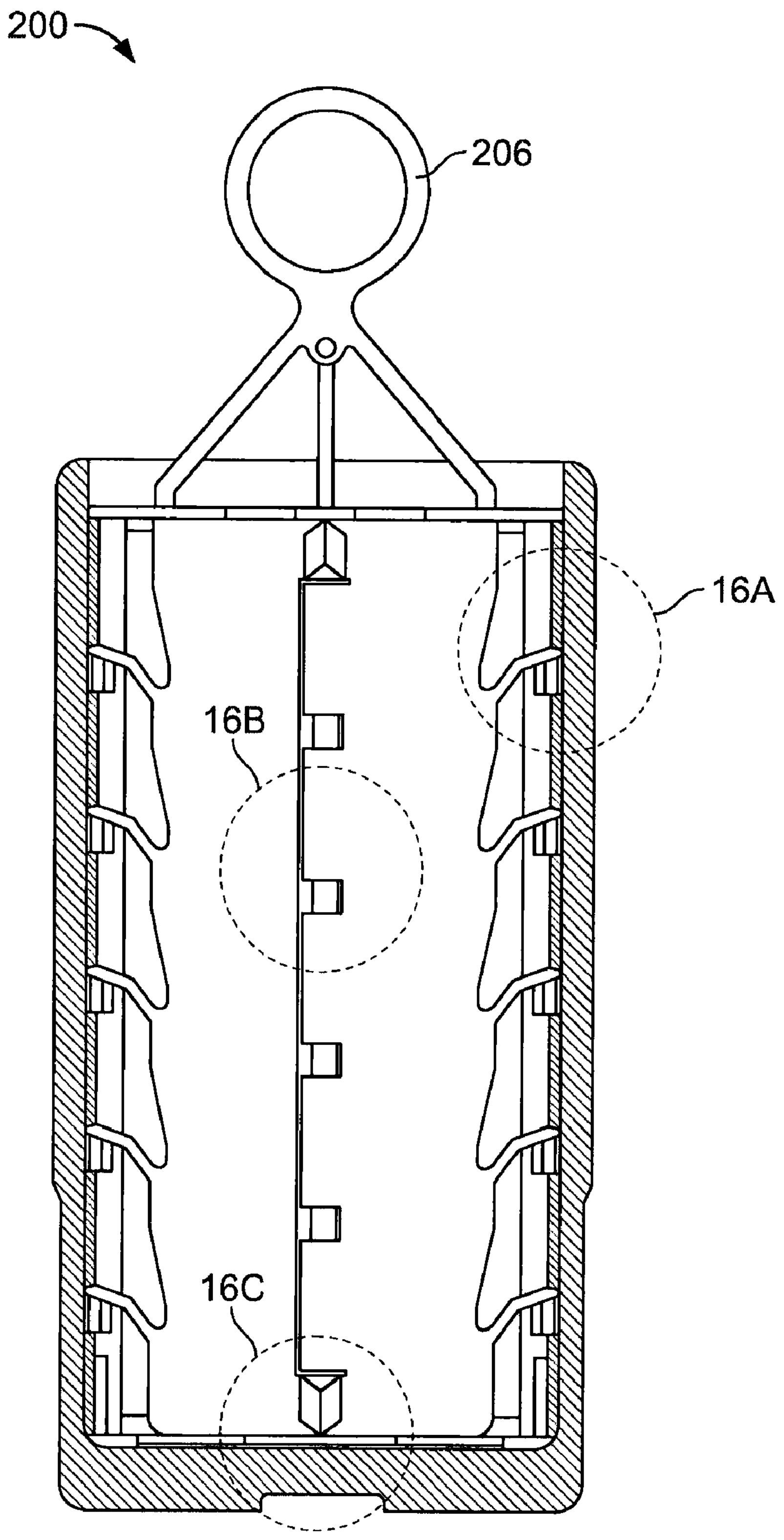
Figure 16A:
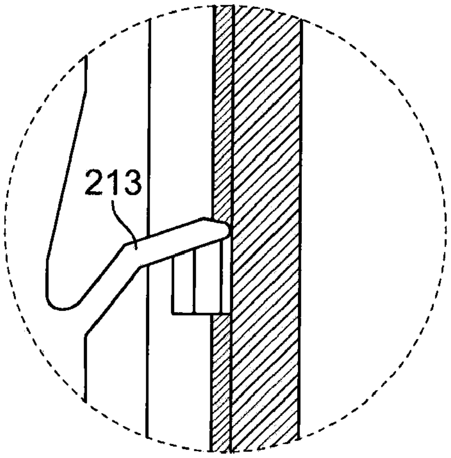
Figure 16B:
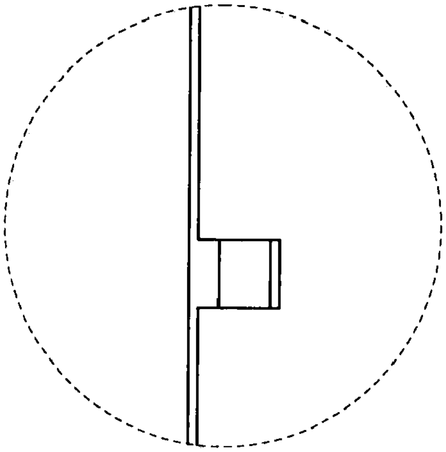
Figure 16C:
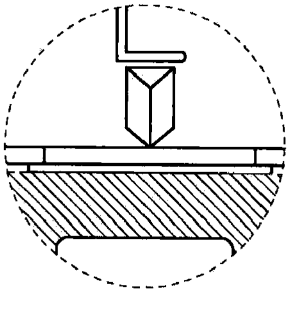

Each arm 213 is structured as a beam with a hinge point 251 and a buckling point around the middle point 252 (see FIGS. 16 and 16A). The material used may have a relatively low modulus of elasticity and high toughness, where toughness is defined as the resistance to fracture of a material when stressed. It is defined as the amount of energy that a material can absorb before rupturing, and can be determined, for example, by finding the area (i.e., by taking the integral) underneath the stress-strain curve.

Figure 17:
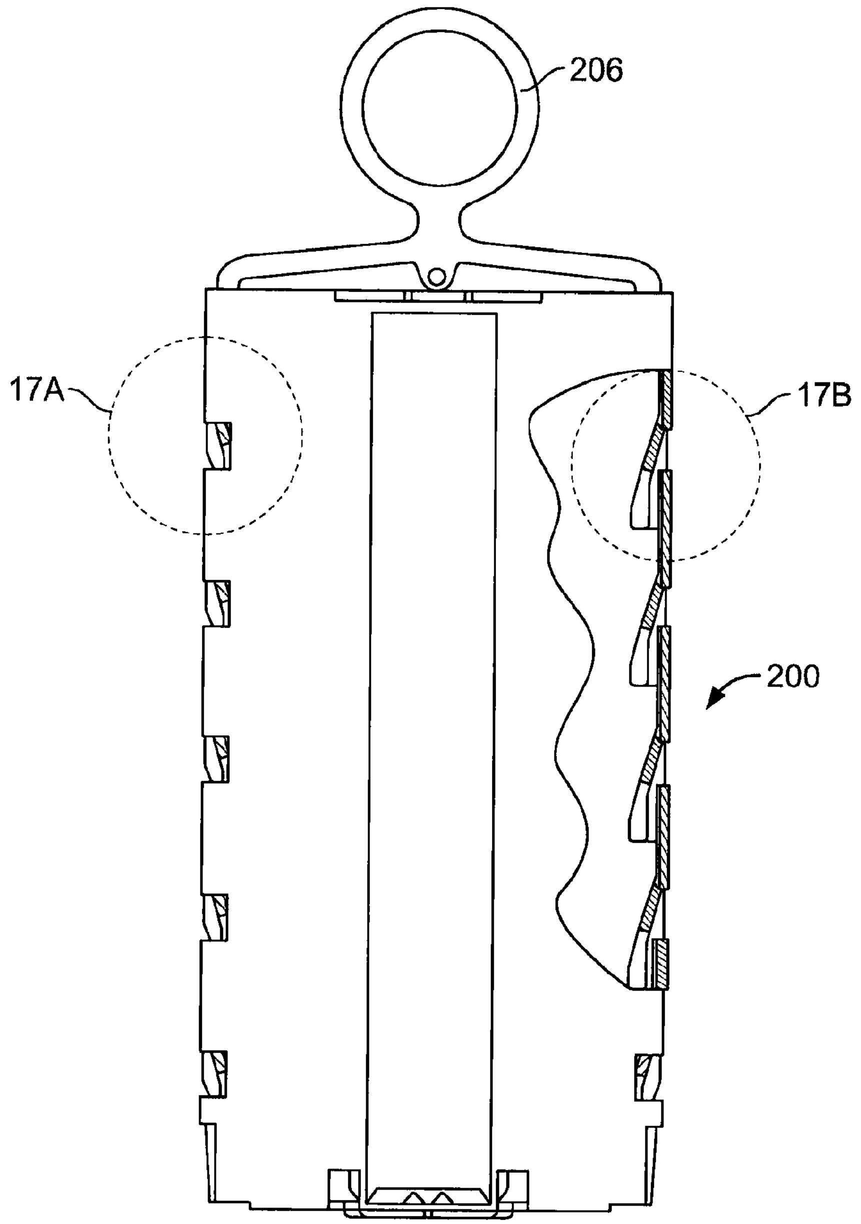
Figure 17A:
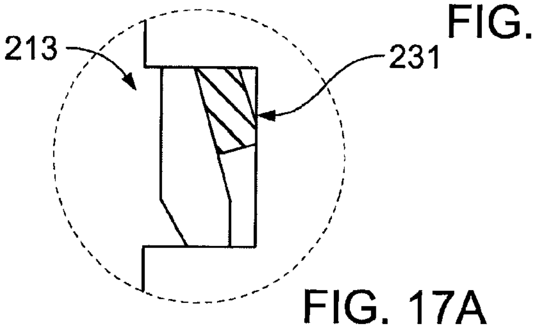
Figure 17B:
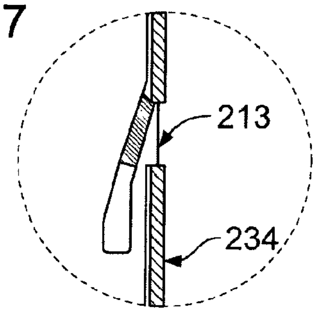

FIGS. 17 and 17A show the positions of the push arms 213. Reference numeral 231 points to the tip of the arm 213 extended in its locking position. FIG. 17B is a cut-away view of the locking feature, showing the arm 213 in an extended position and locked in by the wall 234 of the pusher stacker aperture plate.

Figure 18A:
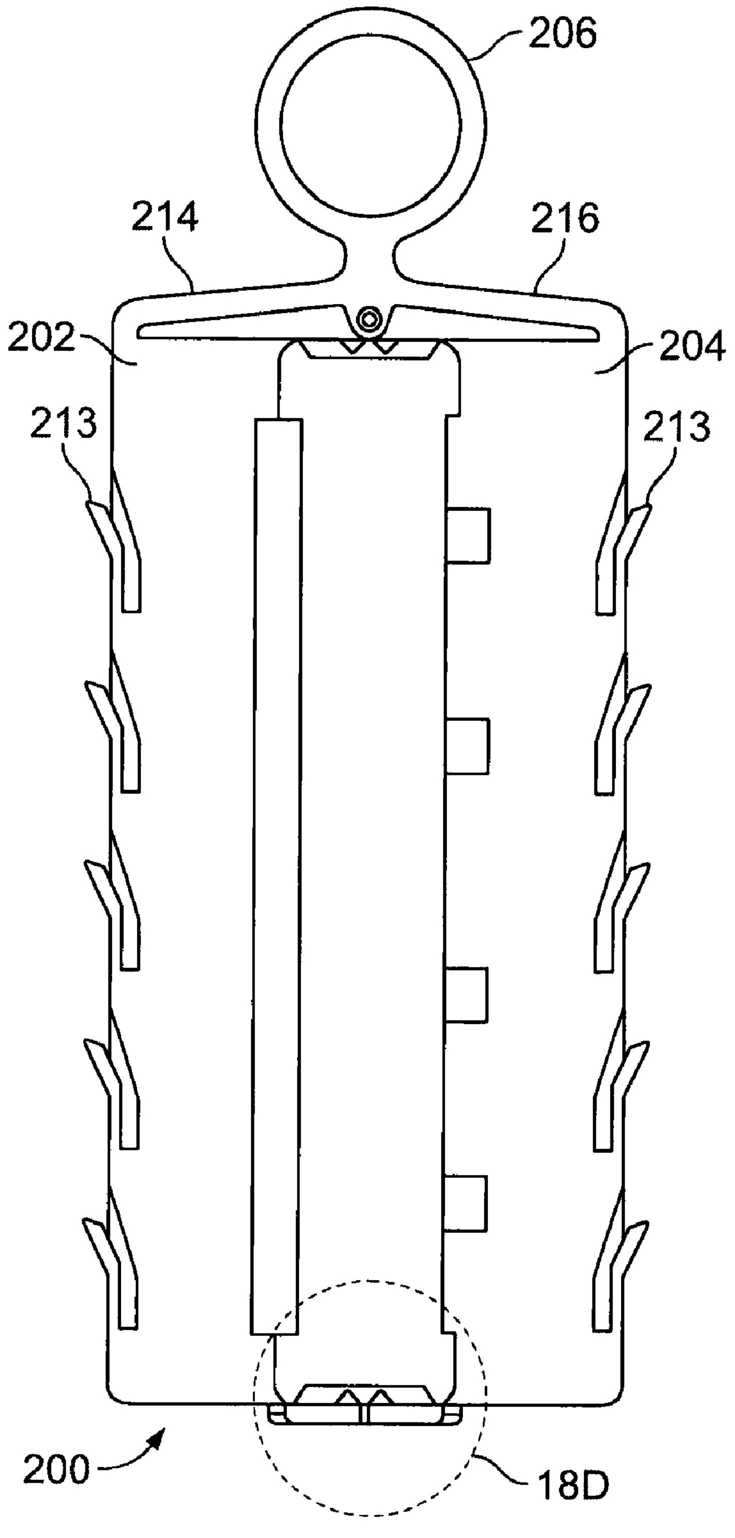
Figure 18B:
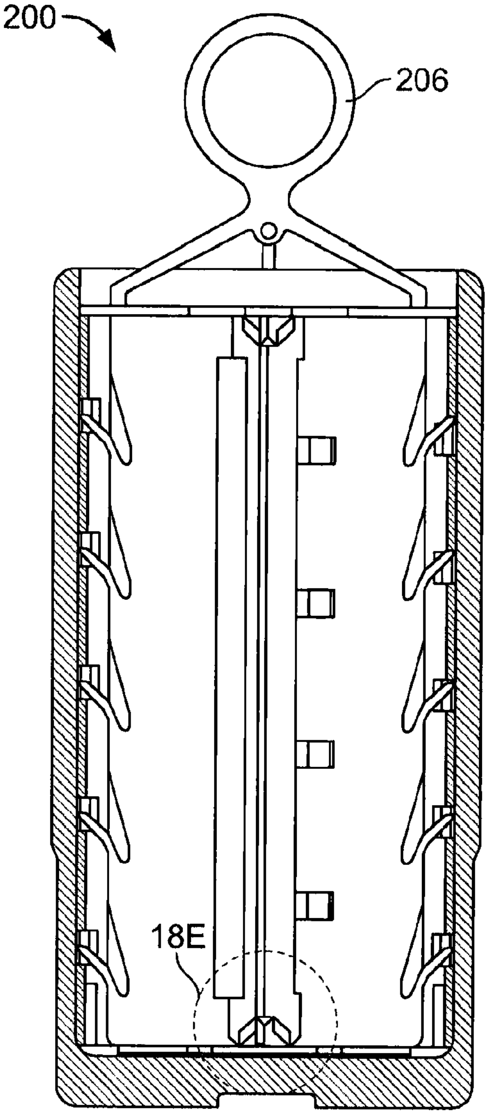
Figure 18C:
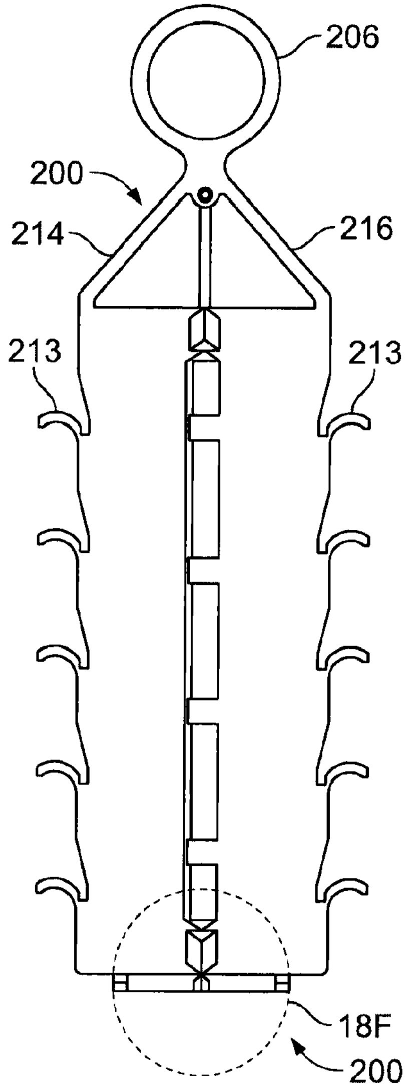
Figure 18D:
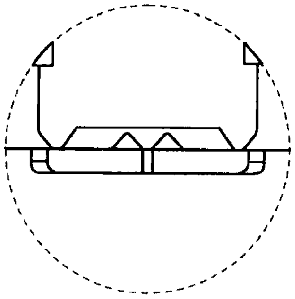
Figure 18E:
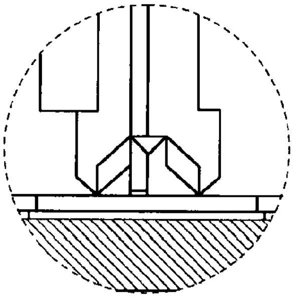
Figure 18F:
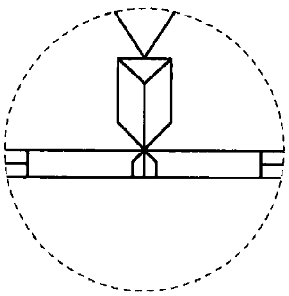

FIGS. 18A, 18B and 18C illustrate the door-closing process. The bag assembly 200 is extracted from the currency cassette by pulling on the handle 206 which has flexible arms 214, 216 attached to the door panes 202, 204. As the bag assembly 200 is pulled out of the cassette, the flexible push arms 213 on the framing door structure are constrained to rotate about their tips 245 which press against the wall 244 of the currency cassette and are maintained by the wall 234 of the openings 231 in the pusher stacker aperture plate (see FIG. 16A). As the arm 213 rotates, its hinged side pushes on the external side of the door panes 202, 204, causing the door to close (FIGS. 18B and 18C). The framing door structure has collapsible arms with hinge points. As the door panels move toward each other, the collapsible arms flex and collapse inside a cavity 246, 247 on each door pane as show in FIGS. 18D, 18E and 18F.

Figure 19:
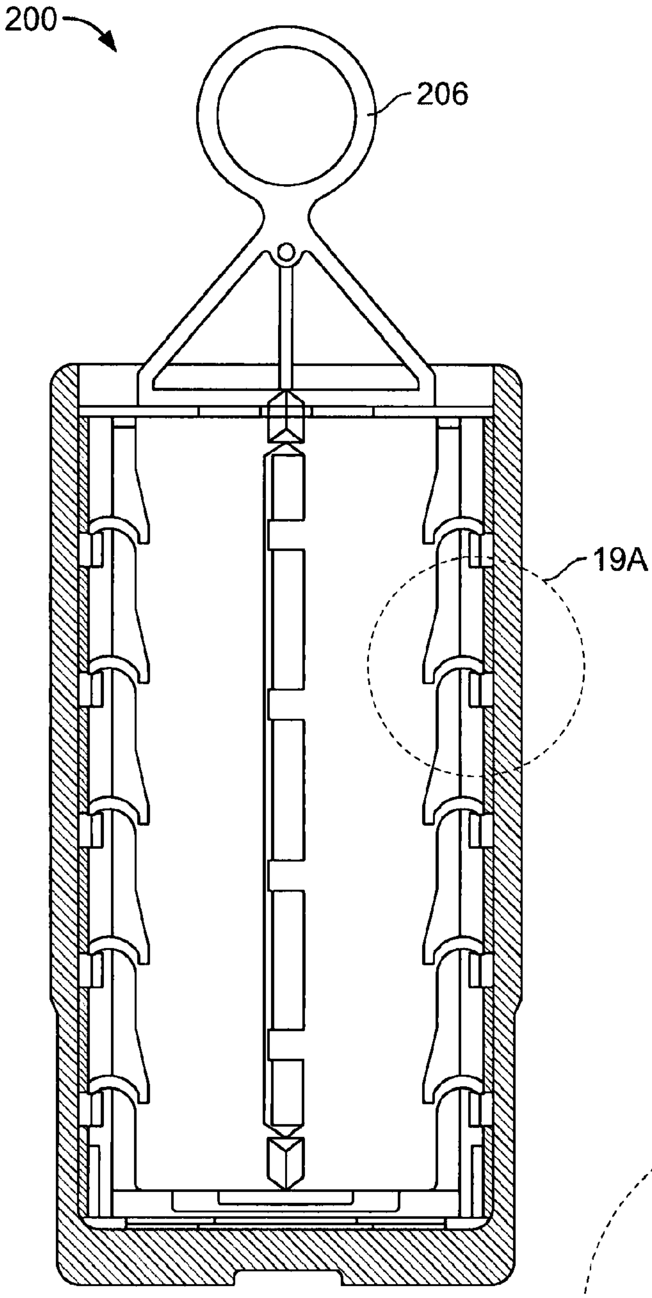
Figure 19A:
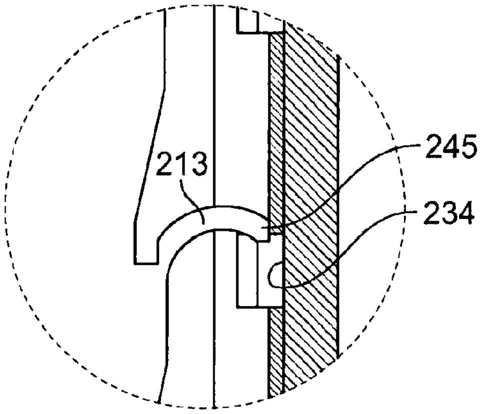

The door closes in an irreversible fashion by male locking features and matching female groove structures, which can be similar to the tie wrap systems commonly used to tie bundles of electric wiring. Preferably, the these structures are on both sides of the interlocking features. When the door is closed, further pulling on the handle 206 causes the arms 213 to buckle and their tips 245 come free to overcome the locking point and to move along the wall 234 as shown in FIGS. 19 and 19A. Variations in the shape of the arms 213 or other aspects are possible to achieve similar effect.

Implementation with Rigid Key Plate

In some implementations, a key plate is provided to seal the aperture opening and unlock the bag assembly from the stacker assembly.

Figure 20:
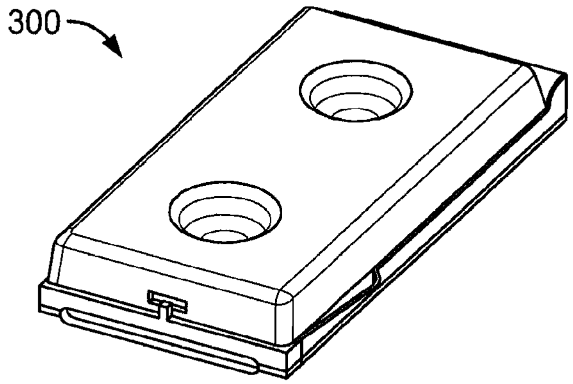
FIGS. 20-26 illustrate views of an implementation that incorporates a rigid key plate to seal the opening of the assembly.
Figure 21:
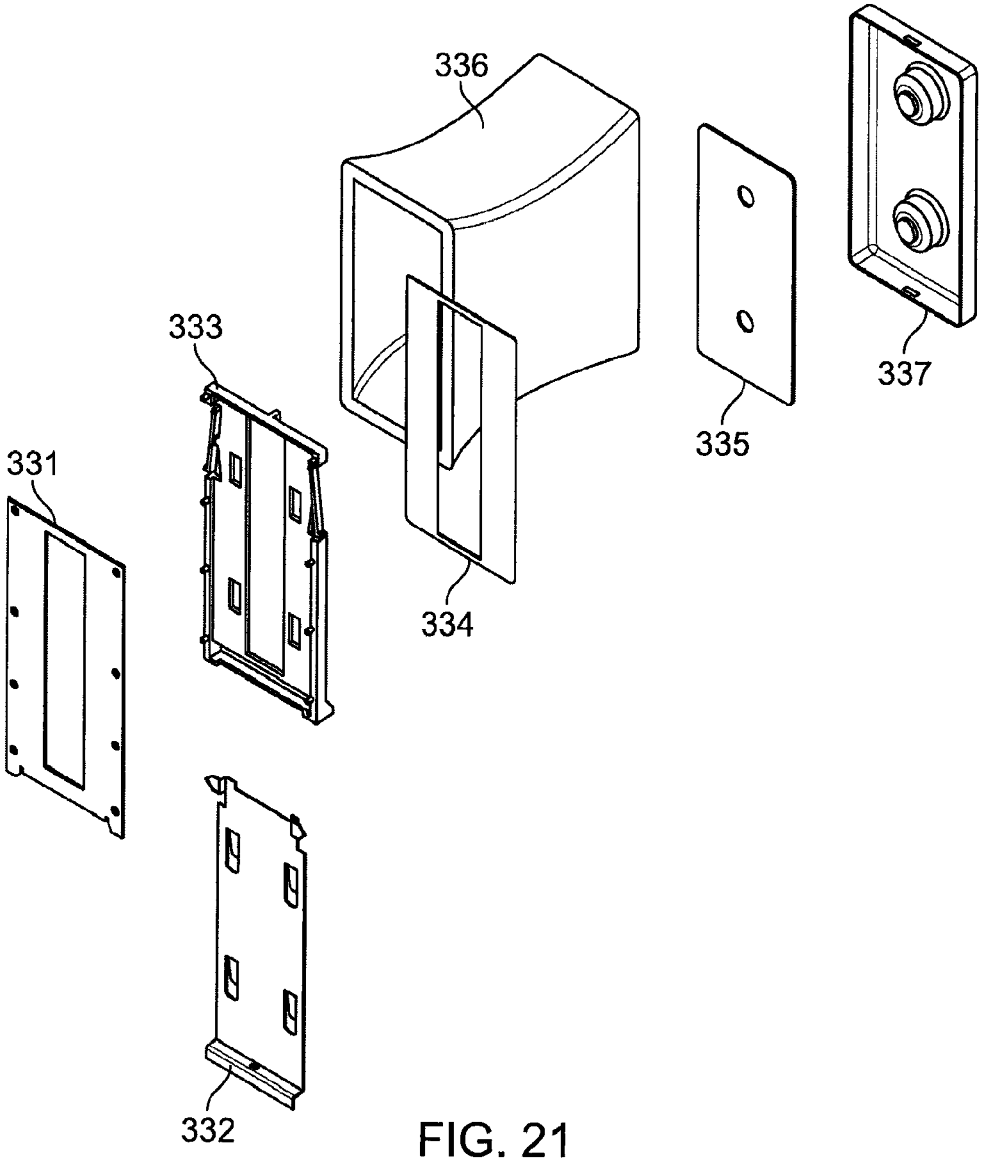

An example of a secure bag assembly 300 that includes a rigid key plate is illustrated in FIG. 20, in which the assembly is shown prior to expansion of the bag in which bills or other documents of value are stored. As illustrated in FIG. 21, the assembly 300 includes an expandable bag 336 which may be made, for example, of an elastic fabric such as nylon or polyester. The front side has a set of structural plates, including a cardboard or polyester seal plate 334, a polypropylene snap plate 333 and a clear acrylic aperture plate 331. The seal plate 334 can be bonded to the bag 336, for example, by an adhesive or other process. The back side has an end cap container that includes a cardboard or polyester plate 335 and a thermoformed or vacuuformed polystyrene plate 337 to act as a container for the fabric bag 336 before it is deployed (i.e., before the bag expands) by the progressive stacking of documents. The plates can be formed of other materials as well. To load the bag 336 into the end cap container, the bag is slid around a temporary support to guide it while the bag is collapsed into the end cap and maintained by the plate 335. Protruding features on the plate 337 are heat stacked with corresponding holes in the plate 335.

A thin steel or rigid plastic key plate 332 is connected to the front side plates. In its original position, when the bag is new, the key plate 332 is hinged at an end, but slides out of the hinge when pushed in to close the bag. When the pack is new, the key plate covers the other front side plates.

Figure 22:
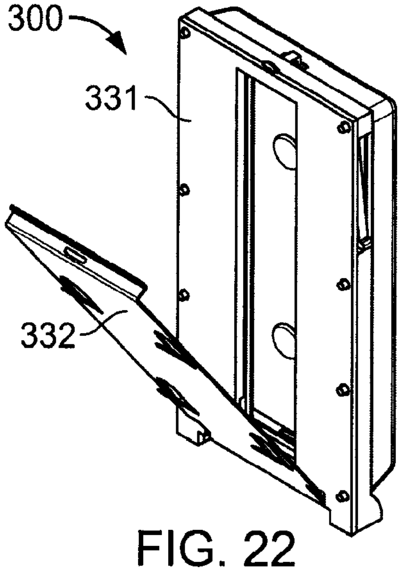
Figure 23:
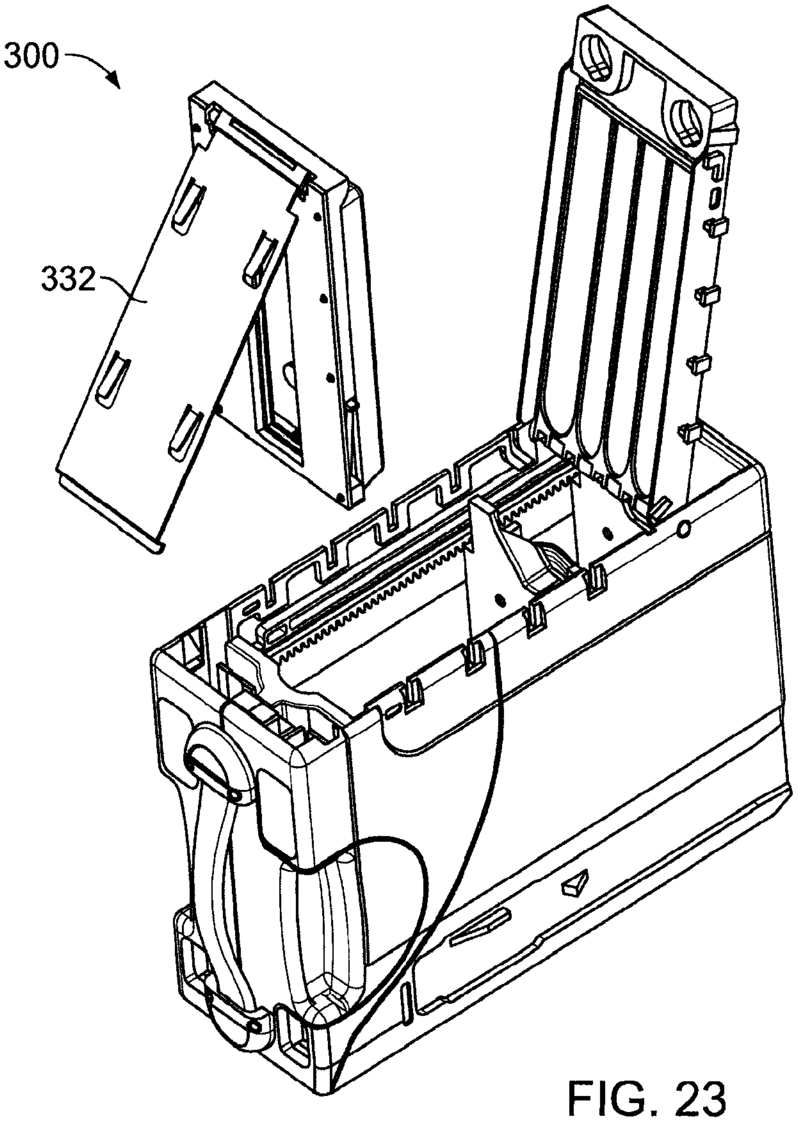

The secure bag assembly 300 can be used as follows. As shown in FIG. 22, the key plate 332 is opened and rotated about its hinges. The assembly is inserted in the currency cassette (FIG. 23) by sliding it in rails of the pusher aperture plate of the stacker assembly. Locking features lock the pack in place.

Figure 24:
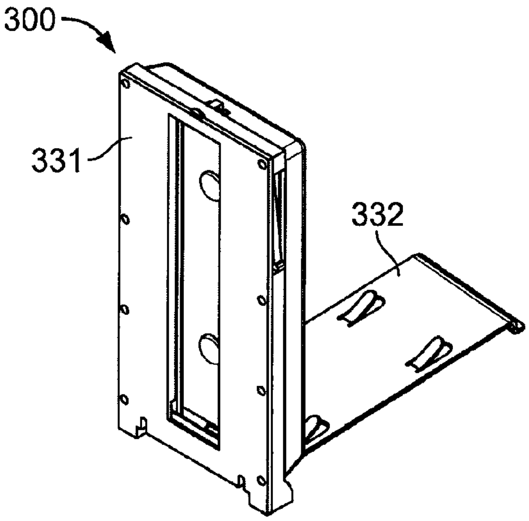
Figure 25:
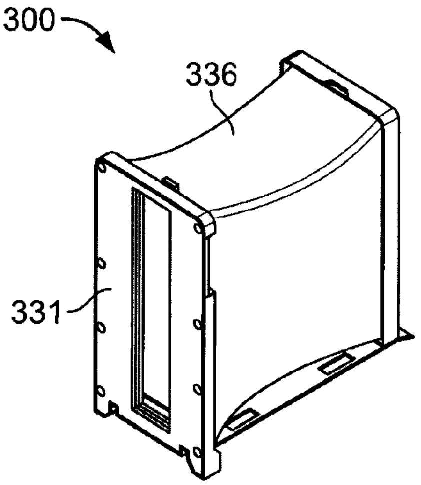
Figure 26:
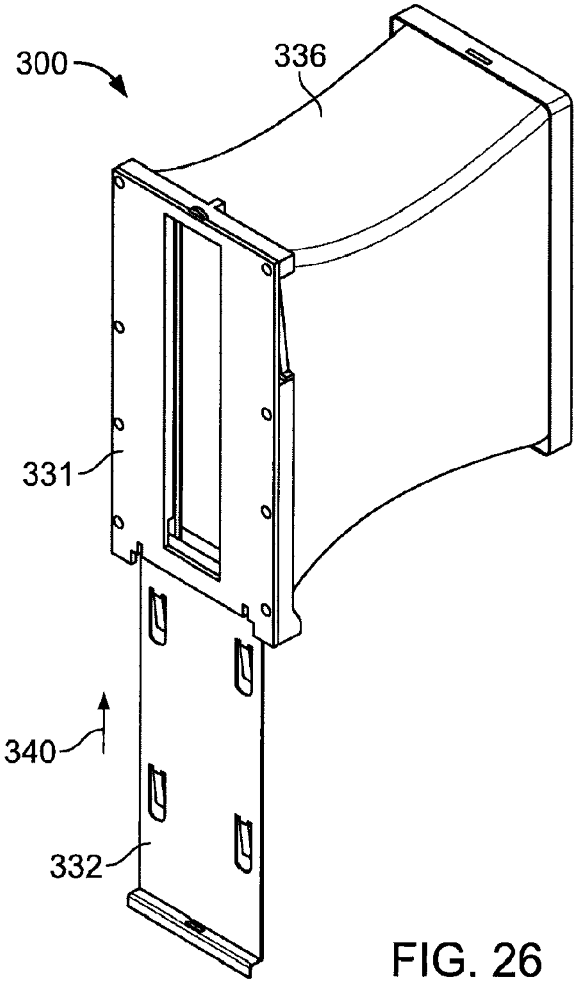

Next, the key plate 332 is folded back (see FIG. 24) into the currency cassette where it rests horizontally behind the cassette door. When bills are stacked, the bag assembly 300 deploys as shown in FIG. 25. To withdraw the assembly 300 from the currency cassette, the cassette door is open, and the key plate 332 is rotated back as shown in FIG. 26.

The key plate 332, in the direction of arrow, between the aperture plate 331 and the snap plate 333 gets out the hinges and closes the bag 336. Towards the end of its travel, the key plate 332 releases the locking features that maintain the bag assembly 300 in the currency cassette.

The rigid key plate has a hinge section that actuates locking levers. The levers are cantilever beams that can be formed as integral parts of the aperture plate 331 and preferably are made of polypropylene so that they are robust enough to provide the hinge function. The locking features can be integral parts of the aperture plate. As the key plate 332 is moved into its cavity, four tabs lock the key plate in place by locking into corresponding cavities in the snap plate 333. The aperture plate 331 can be made of a transparent material to allow inspection of the integrity of the tabs as tampering evidence.

Implementation with a Flexible Film Sheet

Figure 27:
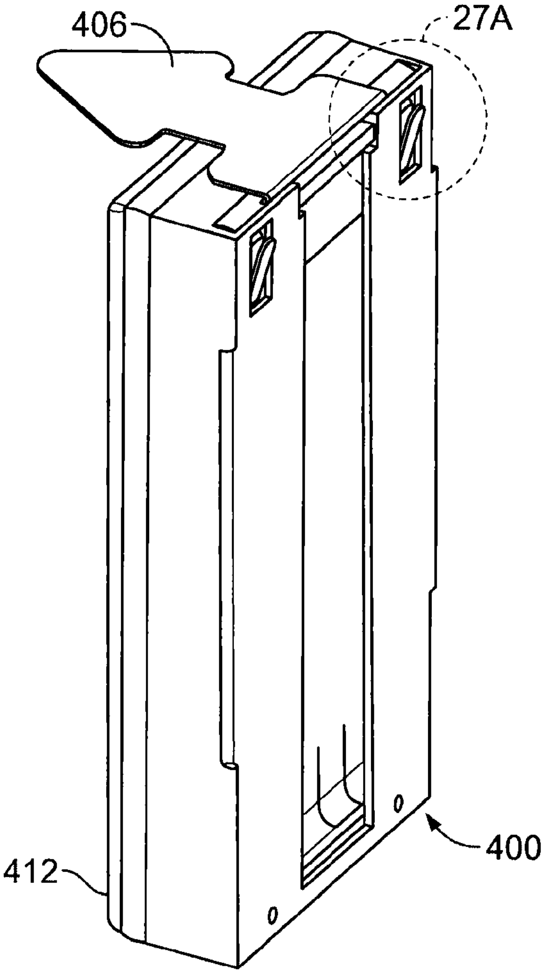
FIGS. 27-30 illustrate views of an implementation that incorporates a flexible film sheet to seal the opening of the assembly.
Figure 28A:
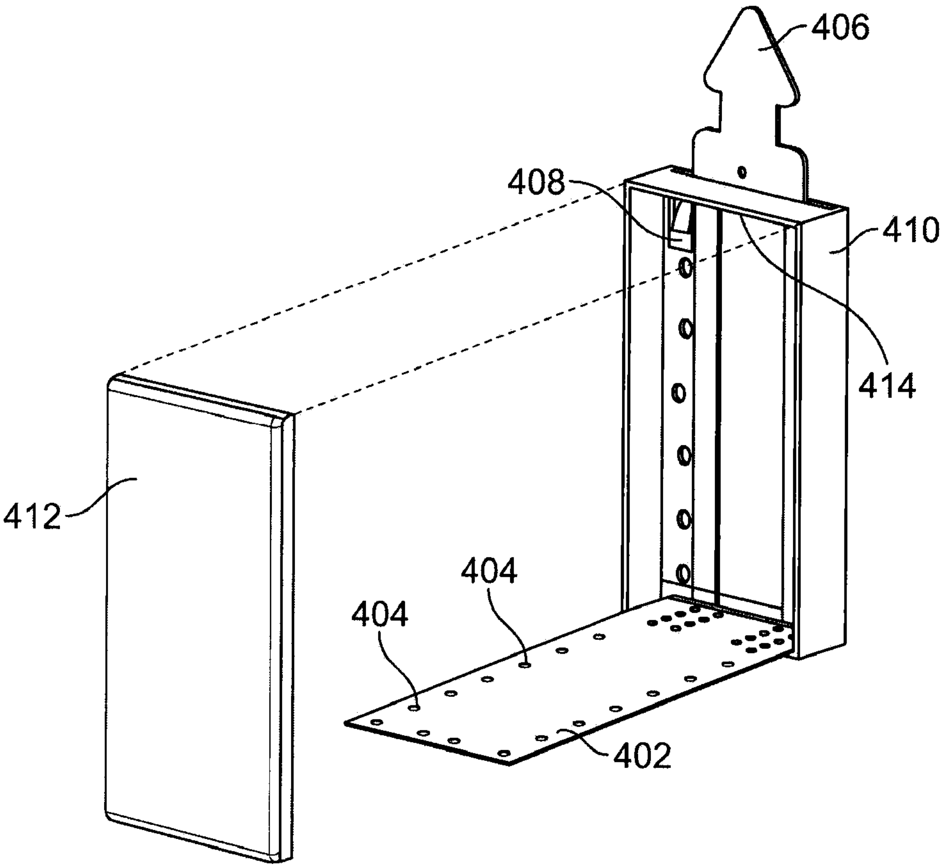
Figure 28B:
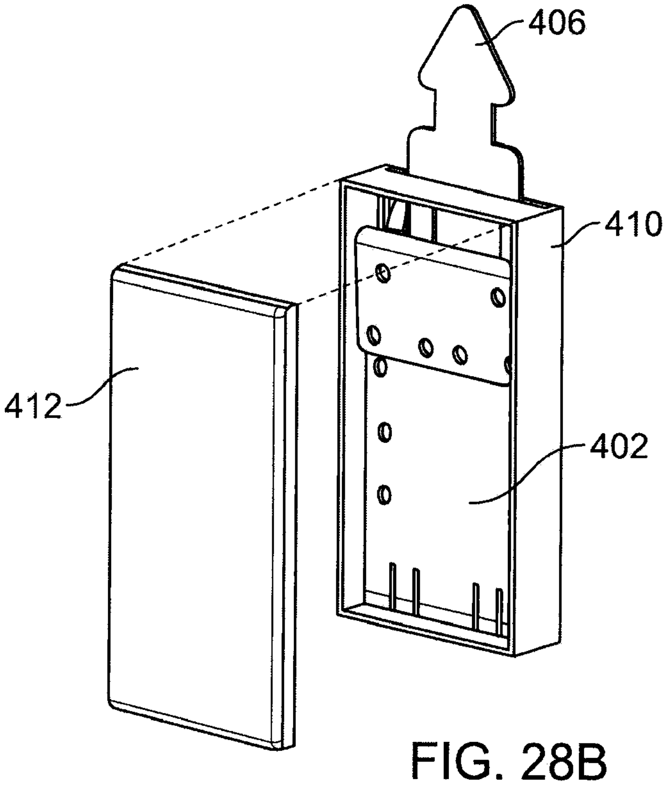

In some implementations, as illustrated in FIGS. 27, 28A and 28B, the container assembly 400 includes a shutter door made of a flexible film sheet 402 (e.g., Mylar or another plastic material) that serves as the sealing means to seal the aperture opening through which bills or other documents of value are received. In such implementations, the aperture opening is sealed by a flexible film 402 having a keyhole pattern 404 that locks into a corresponding pattern of key pins inside the molded plastic housing 410 of the container assembly. Initially, the film sheet is installed folded and floating freely inside the frame or housing 410 (see FIG. 28B). A handle 406 is attached to the end of the film sheet 402. In this implementation, the container assembly is attached to the stacker assembly in the currency cassette using metal or plastic spring clips 408 (FIG. 28B). Pulling the handle 406 causes it to pass by the spring clips 408 and disengage them, thereby unlocking the container assembly from the stacker assembly. At the end of its travel, the keyhole pattern 404 of the flexible film sheet 402 interlocks with the corresponding pattern of key pins inside the housing 410, thereby preventing movement of the film in a manner that would unseal the aperture. A stretchable bag 412 to hold the bills or other documents of value is attached to the housing 410. The bag 412 may be made, for example, of an elastic fabric. As documents are received in the bag 412, it expands.

Figure 27A:
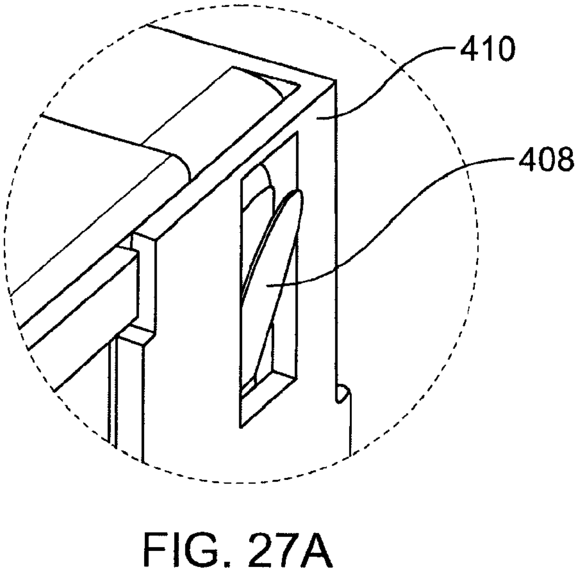

The spring clips 408 can be attached to the housing 410 through a plastic guide located under the top section of the housing (i.e., at the location identified by 414 in FIG. 28A). FIG. 27A shows the clips 408 in their locked position. The housing 410 inserts into guide rails of the stacker pusher plate as in the other implementations.

The material of the clips is preferably metal for robustness and elasticity, but they may be made of plastic.

Figure 29:
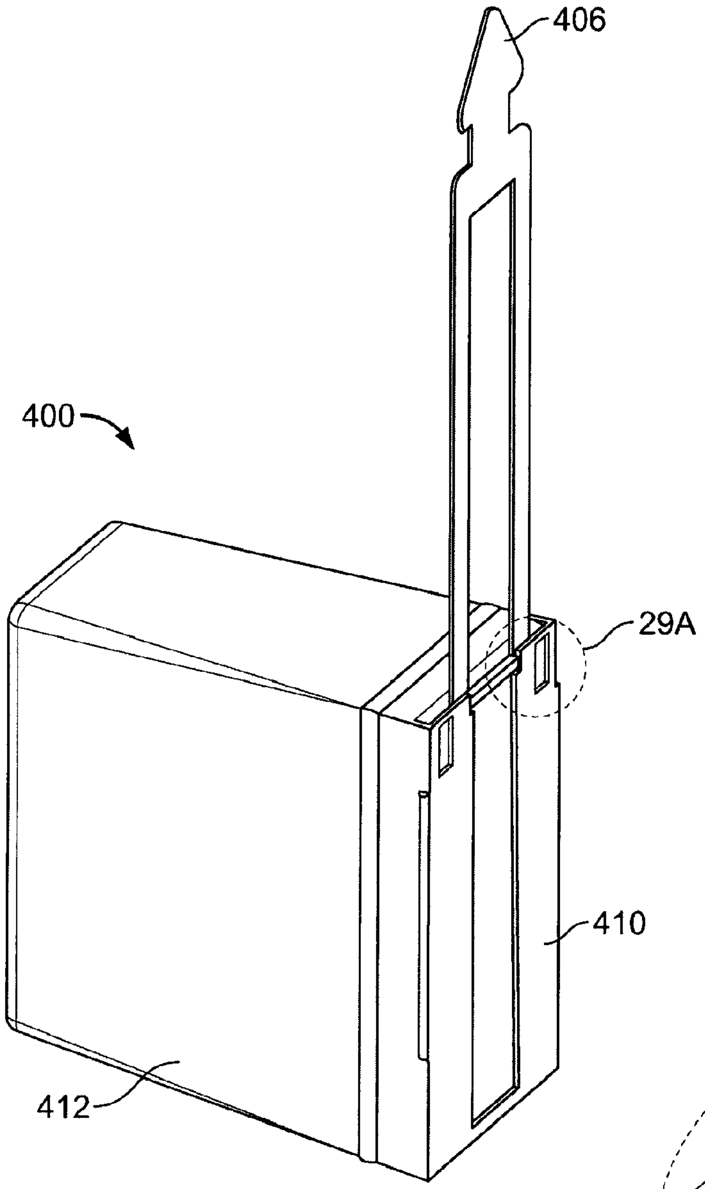
Figure 29A:
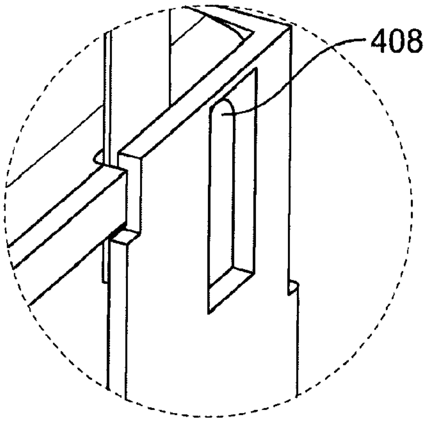
Figures 30A, 30B, 30C:
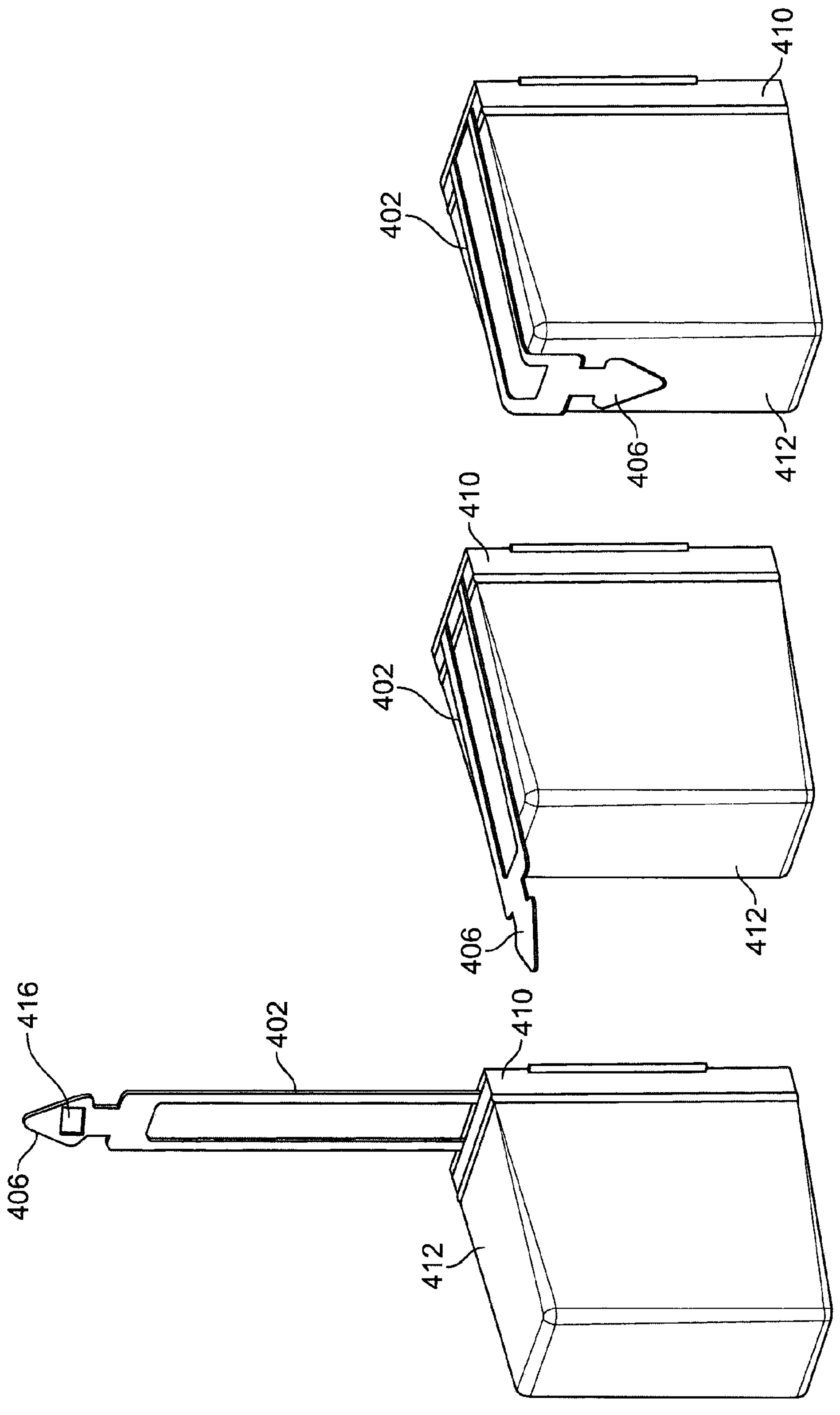

Closing and sealing the bag 412 is achieved by pulling the handle 406 (see FIG. 29). At the end of its travel, the film sheet 402 passes over the clips 408 to disengage them, thereby freeing the bag from the currency cassette. At the end of its travel, the keyholes 404 (FIG. 28A) match the key pins, and the film door 402 is locked in place to prevent tampering. The top of the film sheet 402 also can have keyholes that match pin patterns at the top of the housing. In that case, the film 402 is wrapped around the top corner of the housing. The handle 406 of the film 402 can be wrapped around the bag 412, and its end can be attached to the bag by a pressure sensitive adhesive patch 416, as illustrated on FIGS. 30A, 30B and 30C.

A number of embodiments of the invention have been described. Nevertheless, it will be understood that various modifications may be made without departing from the spirit and scope of the invention. Accordingly, other implementations are within the scope of the claims.

What is claimed is:

1. An apparatus for securely storing bills or other documents of value in a currency cassette having a stacker assembly, the apparatus comprising:

a removable secure container assembly adapted for installation in the currency cassette, the container assembly comprising an opening to receive a document from the stacker assembly, a container to store the document received from the stacker assembly, and a strap, wherein the container assembly is configured so that, when the strap is in a first position, the apparatus is locked to the stacker assembly and the opening is in an unsealed state to allow documents to pass through the opening into the container from the stacker assembly; and the container assembly is configured so that, after the strap is moved to a second position, the opening is sealed by the strap, the container assembly is unlocked from the stacker assembly, and the strap is prevented from moving in a direction that would unseal the opening.

2. The apparatus of claim 1 wherein the secure container assembly comprises:

a first subassembly comprising:

a locking mechanism to lock the container assembly to the stacker assembly;

at least one release to unlock the container assembly from the stacker assembly; and security features that allow only unidirectional movement of the strap.

3. The apparatus of claim 2 wherein the release of the first subassembly is a depressible tab.

4. The apparatus of claim 2 wherein the secure container assembly comprises:

a second subassembly for structurally supporting at least a portion of the container.

5. The apparatus of claim 4 wherein the container assembly is configured so that the first and second subassemblies are affixed to each other before the stacker assembly feeds a document into the container and so that the first and second subassemblies separate from one another when a document is received in the container from the stacker assembly.

6. The apparatus of claim 2 wherein the opening to receive a document from the stacker assembly is defined in the first subassembly.

7. The apparatus of claim 2 wherein:

the container is configured so that, when the strap is in a first position, the container assembly is locked to the stacker assembly and a strap aperture portion is aligned with the opening in the container assembly to allow documents to pass into the container from the stacker assembly; and the container assembly is configured so that, after the strap is moved to a second position, a solid portion of the strap seals the opening in the container assembly and unlocking features on the strap couple with the at least one release to secure the contents of the container and unlock the container assembly from the stacker assembly.

8. The apparatus of claim 7 wherein the first subassembly comprises:

a first plate that defines the opening to receive a document from the stacker assembly; and a second plate comprising strap locking features to allow only unidirectional movement of the strap;

wherein at least a portion of the strap is disposed between the first plate and the second plate.

9. The apparatus of claim 8 wherein, when the container assembly is attached to the stacker assembly, a surface of the first plate provides a surface of a document transport path.

10. The apparatus of claim 9 wherein the first plate comprises bill path spheres that act as ball bearings to assist the transport of documents in the document transport path adjacent to the stacker assembly.

11. The apparatus of claim 8 wherein the strap comprises mating features that couple with the strap locking features of the second plate.

12. The apparatus of claim 11 wherein the portion of the strap that comprises the mating features is made of an inelastic material.

13. The apparatus of claim 7 wherein the portion of the strap that seals the opening in the container assembly when the strap is moved to the second position is made of an inelastic material.

14. The apparatus of claim 2 wherein the locking mechanism is configured to mate with features on the stacker assembly to lock the secure container assembly to the cassette.

15. The apparatus of claim 2 wherein the first subassembly couples to the stacker assembly to form a bill path for the transport of bills into the container.

16. The apparatus of claim 1 wherein the container is expandable.

17. The apparatus of claim 1 wherein the container is a bag.

18. The apparatus of claim 1 wherein the container is made of an opaque material.

19. The apparatus of claim 1 wherein at least a portion of the strap comprises an elastic material.

20. The apparatus of claim 1 wherein the container assembly is configured so that the strap must fully seal the opening before the secure container assembly can be removed from the cassette.

21. The apparatus of claim 20 wherein the container assembly is configured so that the opening is fully sealed contemporaneously with the container assembly being unlocked from the stacker assembly.

22. An apparatus for securely storing bills or other documents of value in a currency cassette having a stacker assembly, the apparatus comprising:

a first subassembly comprising an aperture opening adapted to receive a document from the stacker assembly;

the first subassembly including a locking mechanism to lock the apparatus to the stacker assembly;

a container coupled to the first subassembly for storing the document received through the aperture opening;

a second subassembly disposed in the container for structurally supporting at least a portion of the container; and a strap coupled to the first and second subassemblies and looped inside the container, wherein the strap is movable from a first position to a second position to seal the aperture opening and to unlock the apparatus from the stacker assembly for removal of the apparatus from the cassette.

23. The apparatus of claim 22 wherein the strap has a solid portion and an aperture portion, wherein when the strap is in the first position, the strap aperture portion is aligned with the aperture opening of the first subassembly and the apparatus is locked to the stacker assembly, and when the strap is in the second position, the strap solid portion seals the aperture opening and the apparatus is unlocked from the stacker assembly.

24. The apparatus of claim 23 wherein the locking mechanism of the first subassembly comprises at least one release for unlocking the apparatus from the stacker assembly when the strap is moved to the second position.

25. The apparatus of claim 24 wherein the strap comprises unlocking features that couple with the at least one release of the first subassembly to unlock the apparatus from the stacker assembly.

26. The apparatus of claim 25 wherein the release of the first subassembly is a depressible tab.

27. The apparatus of claim 23 wherein the strap solid portion is made of an inelastic material.

28. The apparatus of claim 23, wherein the locking mechanism comprises:

flexible locking members disposed on the second plate to mate with corresponding features on the stacker assembly.

29. The apparatus of claim 23 wherein the first subassembly comprises a first plate and a second plate, wherein at least a portion of the strap is disposed between the first plate and the second plate.

30. The apparatus of claim 29 wherein the strap comprises one or more holes located adjacent an edge of the strap solid portion; and the second plate comprises finger members that allow only unidirectional movement of the strap by at least one of the finger members engaging with a corresponding hole.

31. The apparatus of claim 29 wherein, when the apparatus is attached to the stacker assembly, a surface of the first plate provides a surface of a document transport path.

32. The apparatus of claim 31 wherein the first plate comprises bill path spheres that act as ball bearings to assist the transport of documents in the document transport path adjacent to the stacker assembly.

33. The apparatus of claim 22 wherein the stacker assembly comprises a pusher plate and the aperture opening of the first subassembly is sized to receive a document from the stacker assembly upon activation of the pusher plate.

34. The apparatus of claim 22 wherein the first subassembly is coupled to an aperture plate of the stacker assembly.

35. The apparatus of claim 22 wherein the container made of an opaque material.

36. The apparatus of claim 22 wherein the container is expandable.

37. The apparatus of claim 36 wherein the strap comprises an elastic portion adapted so that, as the container expands, the elastic portion extends at least part of the distance between the first subassembly and the second subassembly.

38. The apparatus of claim 37 wherein the elastic portion is adapted to support the contents of the container in a tight, bundle-like manner.

39. The apparatus of claim 22 wherein the apparatus is configured so that the first and second subassemblies are affixed to each other before the stacker assembly feeds a document into the container and so that the first and second subassemblies separate from one another when a document is received in the container from the stacker assembly.

40. The apparatus of claim 22 wherein the first subassembly couples to the stacker assembly to form a bill path for the transport of bills into the container.

41. A system for storing bills or other documents of value, the system comprising:

a currency cassette comprising a stacker assembly for stacking validated bills or other documents of value; and an apparatus for securely storing bills or other documents of value in the currency cassette, the apparatus comprising:

a removable secure container assembly adapted for installation in the currency cassette, the container assembly comprising an opening to receive a document from the stacker assembly, a container to store the document received from the stacker assembly, and a strap, wherein the container assembly is configured so that, when the strap is in a first position, the apparatus is locked to the stacker assembly and the opening is in an unsealed state to allow documents to pass through the opening into the container from the stacker assembly; and the container assembly is configured so that, after the strap is moved to a second position, the opening is sealed by the strap, the container assembly is unlocked from the stacker assembly, and the strap is prevented from moving in a direction that would unseal the opening.

42. A method for securely storing bills or other documents of value in a currency cassette having a stacker assembly, the method comprising:

installing a secure container assembly in the cassette so as to lock the container assembly to the stacker assembly, wherein the container assembly comprises an aperture opening, a container, and a strap looped inside the container, the strap comprising a solid portion and an aperture portion, the strap initially being in a first position in which the aperture portion is aligned with the aperture opening;

feeding one or more bills or other documents of value through the aperture opening using the stacker assembly;

storing in the container the one or more bills or other documents of value received via the aperture opening; and moving the strap to a second position so that the solid portion of the strap seals the aperture opening and so that the container assembly is unlocked from the cassette.

43. The method of claim 42 comprising preventing the strap from moving in a direction that would unseal the aperture opening.

44. The method of claim 42 comprising simultaneously unlocking the container assembly from the cassette and aligning the solid portion of the strap with the aperture opening.

45. The method of claim 42 comprising expanding the container as additional bills or other documents of value are stored therein.

46. The method of claim 42 comprising preventing access to the contents of the container without leaving visible evidence of tampering with the container assembly.

47. The method of claim 42 comprising supporting the contents of the container in a tight, bundle-like manner.

48. An apparatus for securely storing bills or other documents of value in a currency cassette, the apparatus comprising:

a removable secure container assembly adapted for installation in the currency cassette, the container assembly comprising an opening to receive a document from a stacker assembly, a container to store the document received from the stacker assembly, and a sealing means for sealing the opening, wherein the container assembly is configured so as to lock to the stacker assembly when the secure container assembly is installed in the currency cassette; and the container assembly is configured so that sealing the opening of the container assembly unlocks the container assembly from the cassette and allows removal of the container assembly therefrom; and wherein the sealing means comprises:

at least one sliding lateral door disposed adjacent the opening; and at least one lever coupled to the lateral door configured so that moving the lever causes the lateral door to seal the opening and unlock the container assembly from the cassette.

49. The apparatus of claim 48 wherein the lever is made of a flexible material.

50. The apparatus of claim 48 wherein the sealing means comprises first and second lateral doors and first and second levers, the first lever coupled to the first lateral door and the second lever coupled to the second lateral door.

51. The apparatus of claim 48 wherein the sealing means comprises:

a plate sized to seal the opening and be inserted into the container assembly configured so that upon insertion, the plate seals the opening and the container assembly is unlocked from the cassette.

52. A system comprising:

a bill validator;

a currency cassette coupled to the bill validator;

a stacker assembly coupled to the currency cassette; and a removable secure container assembly adapted for installation in the currency cassette, the container assembly comprising an opening to receive a document from the stacker assembly, a container to store the document received from the stacker assembly, and a sealing means for sealing the opening, wherein the container assembly is configured so that, when the sealing means is in a first position, the contain assembly is locked to the stacker assembly and the opening is in an unsealed state to allow documents to pass through the opening into the container from the stacker assembly; and the container assembly is configured so that, after the sealing means is moved to a second position, the opening is sealed by the sealing means, the container assembly is unlocked from the stacker assembly, and the sealing means is prevented from moving in a direction that would unseal the opening.

53. The system of claim 52 wherein the sealing means comprises a strap.

54. The system of claim 52 wherein the container subassembly couples to the stacker assembly to form a bill path for the transport of bills into the container.

55. The system of claim 52 wherein the container is expandable.

56. The system of claim 52 wherein the container stores documents validated by the bill validator.

* * * * *

UNITED STATES PATENT AND TRADEMARK OFFICE

CERTIFICATE OF CORRECTION

PATENT NO. : 7,837,095 B2
APPLICATION NO. : 11/616775
DATED : November 23, 2010
INVENTOR(S) : Robert J. Clauser et al.

It is certified that error appears in the above-identified patent and that said Letters Patent is hereby corrected as shown below:

Col. 18, claim 52, line 12, change "contain" to --container--.

Signed and Sealed this
Fifteenth Day of March, 2011

David J. Kappos
*Director of the United States Patent and Trademark Office*